United States Patent
Tang et al.

(10) Patent No.: US 10,650,735 B2
(45) Date of Patent: May 12, 2020

(54) CHARGE PUMP, VOLTAGE CONTROL METHOD FOR CHARGE PUMP, AND DISPLAY DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Jituo Tang, Beijing (CN); Guohuo Su, Beijing (CN); Shulin Yao, Beijing (CN); Zhihua Sun, Beijing (CN); Yinlong Zhang, Beijing (CN); Xu Zhang, Beijing (CN); Ning Zhang, Beijing (CN); Wenpeng Ma, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/168,958

(22) Filed: Oct. 24, 2018

(65) Prior Publication Data

US 2019/0279560 A1 Sep. 12, 2019

(30) Foreign Application Priority Data

Mar. 9, 2018 (CN) .......................... 2018 1 0195288

(51) Int. Cl.
*G09G 3/3208* (2016.01)
*H02M 3/07* (2006.01)

(52) U.S. Cl.
CPC ............ *G09G 3/3208* (2013.01); *H02M 3/07* (2013.01); *G09G 2330/02* (2013.01)

(58) Field of Classification Search
CPC .... G09G 3/3208; G09G 2330/02; H02M 3/07
See application file for complete search history.

(56) References Cited

U.S. PATENT DOCUMENTS

| | | | |
|---|---|---|---|
| 5,877,948 A * | 3/1999 | Dijkmans ............... | H02M 3/07 307/110 |
| 2003/0067289 A1* | 4/2003 | Morita ................. | G09G 3/3611 323/282 |

(Continued)

FOREIGN PATENT DOCUMENTS

| | | |
|---|---|---|
| CN | 102447301 A | 5/2012 |
| CN | 102739040 A | 10/2012 |
| EP | 0860047 B1 | 1/2000 |

OTHER PUBLICATIONS

First Office Action for Chinese Application No. 201810195288.0, dated May 8, 2019, 9 Pages.

*Primary Examiner* — Carolyn R Edwards
(74) *Attorney, Agent, or Firm* — Brooks Kushman P.C.

(57) ABSTRACT

A charge pump, a voltage control method for the charge pump, and a display device are provided. The charge pump includes a voltage output end and a first step-up circuitry. The first step-up circuitry includes a first energy storage unit, a second energy storage unit, a first input control unit, a first voltage application control unit, a first output control unit and a first charging path control unit. The first voltage application control unit is configured to enable a first end of the first energy storage unit to be electrically connected to, or electrically disconnected from, a first voltage end, and enable a first end of the second energy storage unit to be electrically connected to, or electrically disconnected from, a second voltage end.

16 Claims, 4 Drawing Sheets

(56) References Cited

U.S. PATENT DOCUMENTS

2012/0074894 A1* 3/2012 Chen .................. H01M 16/00
  320/103
2012/0249224 A1* 10/2012 Wei ..................... H02M 3/07
  327/536

* cited by examiner

601 — at a first charging stage, controlling, by at least one of a first input control unit, a first voltage application control unit and a first charging path control unit, a charging path from a first input voltage end to a first energy storage unit, controlling, by at least one of the first input control unit, the first voltage application control unit and the first charging path control unit, a charging path from the first input voltage end to a second energy storage unit, and enabling, by a first output control unit, a second end of the second energy storage unit to be electrically disconnected from a voltage output end 602 — at a first output stage, enabling, by the first output control unit, the second end of the second energy storage unit to be electrically connected to the voltage output end, and at the first output stage, controlling, by at least one of the first input control unit, the first voltage application control unit and the first charging path control unit, charging paths from the first input voltage end to the first energy storage unit and the second energy storage unit, or a charging path from the first input voltage end to the second energy storage unit

Fig. 6

CHARGE PUMP, VOLTAGE CONTROL METHOD FOR CHARGE PUMP, AND DISPLAY DEVICE

CROSS-REFERENCE TO RELATED APPLICATION

This application claims priority to Chinese Patent Application No. 201810195288.0 filed on Mar. 9, 2018, which is incorporated herein by reference in its entirety.

TECHNICAL FIELD

The present disclosure relates to the field of voltage boosting technology, in particular to a charge pump, a voltage control method for the charge pump, and a display device.

BACKGROUND

Organic light-emitting diodes (OLEDs) have been widely used in a small-size flat-panel display device such as mobile phone or flat-panel computer, and an integration degree and power consumption of a driving circuitry of the display device are highly demanded. A charge pump is a preferred step-up/step-down circuitry for a power source management module of the small-size display device due to such features as simple structure and high integration degree. However, usually a lithium battery is adopted by the small-size OLED display device, and its service voltage may decline along with an increase in its service time.

SUMMARY

A main object of the present disclosure is to provide a charge pump, a voltage control method and a display device, so as to solve the above-mentioned problem.

In one aspect, the present disclosure provides in some embodiments a charge pump, including a voltage output end and a first step-up circuitry. The first step-up circuitry includes a first energy storage circuit, a second energy storage circuit, a first input control circuit, a first voltage application control circuit, a first output control circuit and a first charging path control circuit. The first input control circuit is configured to enable a first input voltage end to be electrically connected to, or electrically disconnected from, a first end of the first energy storage circuit, enable the first input voltage end to be electrically connected to, or electrically disconnected from, a second end of the first energy storage circuit, enable the first input voltage end to be electrically connected to, or electrically disconnected from, a first end of the second energy storage circuit, and enable the first input voltage end to be electrically connected to, or electrically disconnected from, a second end of the second energy storage circuit. The first voltage application control circuit is configured to enable the first end of the first energy storage circuit to be electrically connected to, or electrically disconnected from, a first voltage end, and enable the first end of the second energy storage circuit to be electrically connected to, or electrically disconnected from, a second voltage end. The first charging path control circuit is configured to enable the second end of the first energy storage circuit to be electrically connected to, or electrically disconnected from, the first end of the second energy storage circuit, and enable the second end of the first energy storage circuit to be electrically connected to, or electrically disconnected from, the second end of the second energy storage circuit. The first output control circuit is configured to enable the second end of the second energy storage circuit to be electrically connected to, or electrically disconnected from, the voltage output end.

In a possible embodiment of the present disclosure, the charge pump further includes a second step-up circuitry. The second step-up circuitry includes a third energy storage circuit, a fourth energy storage circuit, a second input control circuit, a second voltage application control circuit, a second output control circuit and a second charging path control circuit. The second input control circuit is configured to enable a second input voltage end to be electrically connected to, or electrically disconnected from, a first end of the third energy storage circuit, enable the second input voltage end to be electrically connected to, or electrically disconnected from, a second end of the third energy storage circuit, enable the second input voltage end to be electrically connected to, or electrically disconnected from, a first end of the fourth energy storage circuit, and enable the second input voltage end to be electrically connected to, or electrically disconnected from, a second end of the fourth energy storage circuit. The second voltage application control circuit is configured to enable the first end of the third energy storage circuit to be electrically connected to, or electrically disconnected from, a third voltage end, and enable the first end of the fourth energy storage circuit to be electrically connected to, or electrically disconnected from, a fourth voltage end. The second charging path control circuit is configured to enable the second end of the third energy storage circuit to be electrically connected to, or electrically disconnected from, the first end of the fourth energy storage circuit, and enable the second end of the third energy storage circuit to be electrically connected to, or electrically disconnected from, the second end of the fourth energy storage circuit. The second output control circuit is configured to enable the second end of the fourth energy storage circuit to be electrically connected to, or electrically disconnected from, the voltage output end.

In a possible embodiment of the present disclosure, the charge pump further includes an input voltage control circuitry configured to apply corresponding input voltages to the first input voltage end and the second input voltage end alternately.

In a possible embodiment of the present disclosure, the first energy storage circuit includes a first storage capacitor, a negative plate of which is the first end of the first energy storage circuit, and a positive plate of which is the second end of the first energy storage circuit. The second energy storage circuit includes a second storage capacitor, a negative plate of which is the first end of the second energy storage circuit, and a positive plate of which is the second end of the second energy storage circuit. The first input control circuit includes: a first input control transistor, a first electrode of which is electrically connected to the first input voltage end, and a second electrode of which is electrically connected to the positive plate of the second storage capacitor; a second input control transistor, a first electrode of which is electrically connected to the first input voltage end, and a second electrode of which is electrically connected to the negative plate of the first storage capacitor; a third input control transistor, a first electrode of which is electrically connected to the first input voltage end, and a second electrode of which is electrically connected to the positive plate of the first storage capacitor; a fourth input control transistor, a first electrode of which is electrically connected to the first input voltage end, and a second electrode of which is electrically connected to the negative plate of the second storage capacitor; and a first input control sub-circuit electrically connected to gate electrodes of the first input control transistor, the second input control transistor, the third input control transistor and the fourth input control transistor, and configured to turn on or turn off the first input control transistor, the second input control transistor, the third input control transistor, and the fourth input control transistor.

In a possible embodiment of the present disclosure, the first voltage application control circuit includes: a first voltage application control transistor, a first electrode of which is electrically connected to the negative plate of the first storage capacitor, and a second electrode of which is electrically connected to the first voltage end; a second voltage application control transistor, a first electrode of which is electrically connected to the negative plate of the second storage capacitor, and a second electrode of which is electrically connected to the second voltage end; and a first voltage application control sub-circuit electrically connected to a gate electrode of the first voltage application control transistor and a gate electrode of the second voltage application control transistor, and configured to turn on or turn off the first voltage application control transistor and the second voltage application control transistor. The first charging path control circuit includes: a first charging path control transistor, a first electrode of which is electrically connected to the positive plate of the first storage capacitor, and a second electrode of which is electrically connected to the positive plate of the second storage capacitor; a second charging path control transistor, a first electrode of which is electrically connected to the positive plate of the first storage capacitor, and a second electrode of which is electrically connected to the negative plate of the second storage capacitor; and a first charging path control sub-circuit electrically connected to a gate electrode of the first charging path control transistor and a gate electrode of the second charging path control transistor, and configured to turn on or turn off the first charging path control transistor and the second charging path control transistor. The first output control circuit includes: a first output control transistor, a first electrode of which is electrically connected to the positive plate of the second storage capacitor, and a second electrode of which is electrically connected to the voltage output end; and a first output control sub-circuit electrically connected to a gate electrode of the first output control transistor and configured to turn on or turn off the first output control transistor.

In a possible embodiment of the present disclosure, the third energy storage circuit includes a third storage capacitor, a negative plate of which is the first end of the third energy storage circuit and a positive plate of which is the second end of the third energy storage circuit. The fourth energy storage circuit includes a fourth storage capacitor, a negative plate of which is the first end of the fourth energy storage circuit and a positive plate of which is the second end of the fourth energy storage circuit. The second input control circuit includes: a fifth input control transistor, a first electrode of which is electrically connected to the second input voltage end, and a second electrode of which is electrically connected to the positive plate of the fourth storage capacitor; a sixth input control transistor, a first electrode of which is electrically connected to the second input voltage end, and a second electrode of which is electrically connected to the negative plate of the third storage capacitor; a seventh input control transistor, a first electrode of which is electrically connected to the second input voltage end, and a second electrode of which is electrically connected to the positive plate of the third storage capacitor; an eighth input control transistor, a first electrode of which is electrically connected to the second input voltage end, and a second electrode of which is electrically connected to the negative plate of the fourth storage capacitor; and a second input control sub-circuit electrically connected to gate electrodes of the fifth input control transistor, the sixth input control transistor, the seventh input control transistor and the eighth input control transistor, and configured to turn on or turn off the fifth input control transistor, the sixth input control transistor, the seventh input control transistor and the eighth input control transistor.

In a possible embodiment of the present disclosure, the second voltage application control circuit includes: a third voltage application control transistor, a first electrode of which is electrically connected to the negative plate of the third storage capacitor, and a second electrode of which is electrically connected to the third voltage end; a fourth voltage application control transistor, a first electrode of which is electrically connected to the negative plate of the fourth storage capacitor, and a second electrode of which is electrically connected to the fourth voltage end; and a second voltage application control sub-circuit electrically connected to gate electrodes of the third voltage application control transistor and the fourth voltage application control transistor, and configured to turn on or turn off the third voltage application control transistor and the fourth voltage application control transistor. The second charging path control circuit includes: a third charging path control transistor, a first electrode of which is electrically connected to the positive plate of the third storage capacitor, and a second electrode of which is electrically connected to the positive plate of the fourth storage capacitor; a fourth charging path control transistor, a first electrode of which is electrically connected to the positive plate of the third storage capacitor, and a second electrode of which is electrically connected to the negative plate of the fourth storage capacitor; and a second charging path control sub-circuit electrically connected to gate electrodes of the third charging path control transistor and the fourth charging path control transistor, and configured to turn on or turn off the third charging path control transistor and the fourth charging path control transistor. The second output control circuit includes: a second output control transistor, a first electrode of which is electrically connected to the positive plate of the fourth storage capacitor, and a second electrode of which is electrically connected to the voltage output end; and a second output control sub-circuit electrically connected to a gate electrode of the second output control transistor, and configured to turn on or turn off the second output control transistor.

In a possible embodiment of the present disclosure, the charge pump further includes: an output capacitor, a positive plate of which is electrically connected to the voltage output end, and a negative plate of which is electrically connected to a fifth voltage end; and a switch control circuit electrically connected to the first end of the second energy storage circuit and the second end of the fourth energy storage circuit, and configured to enable the first end of the second energy storage circuit to be electrically connected to, or electrically disconnected from, the second end of the fourth energy storage circuit.

In another aspect, the present disclosure provides in some embodiments a voltage control method for the above-mentioned charge pump, including: a first charging step of, at a first charging stage, controlling, by at least one of a first input control circuit, a first voltage application control circuit and a first charging path control circuit, a charging path that is from a first input voltage end to a first energy storage circuit and configured to charge the first energy storage circuit, controlling, by at least one of the first input control circuit, the first voltage application control circuit and the first charging path control circuit, a charging path that is from the first input voltage end to a second energy storage circuit and configured to charge the second energy storage circuit, and enabling, by a first output control circuit, a second end of the second energy storage circuit to be electrically disconnected from a voltage output end; and a first output step of, at a first output stage, enabling, by the first output control circuit, the second end of the second energy storage circuit to be electrically connected to the voltage output end, and at the first output stage, controlling, by at least one of the first input control circuit, the first voltage application control circuit and the first charging path control circuit, charging paths that are from the first input voltage end to the first energy storage circuit and the second energy storage circuit and configured to charge the first energy storage circuit and the second energy storage circuit, or a charging path that is from the first input voltage end to the second energy storage circuit and configured to charge the second energy storage circuit.

In a possible embodiment of the present disclosure, the charge pump further includes a second step-up circuitry, and the second step-up circuitry includes a third energy storage circuit, a fourth energy storage circuit, a second input control circuit, a second voltage application control circuit, a second output control circuit and a second charging path control circuit. Each step-up period includes first voltage control time periods and second voltage control time periods arranged alternately. With each second voltage control time period, the voltage control method further includes: a second charging step of, at a second charging stage, controlling, by at least one of the second input control circuit, the second voltage application control circuit and the second charging path control circuit, a charging path that is from a second input voltage end to the third energy storage circuit and configured to charge the third energy storage circuit, controlling, by at least one of the second input control circuit, the second voltage application control circuit and the second charging path control circuit, a charging path that is from the second input voltage end to the fourth energy storage circuit and configured to charge the fourth energy storage circuit, and enabling, by the second output control circuit, a second end of the fourth energy storage circuit to be electrically disconnected from the voltage output end; and a second output step of, at a second output stage, enabling, by the second output control circuit, the second end of the fourth energy storage circuit to be electrically connected to the voltage output end, and at the second output stage, controlling, by at least one of the second input control circuit, the second voltage application control circuit and the second charging path control circuit, charging paths that are from the second input voltage end to the third energy storage circuit and the fourth energy storage circuit and configured to charge the third energy storage circuit and the fourth energy storage circuit, or a charging path that is from the second input voltage end to the fourth energy storage circuit and configured to charge the fourth energy storage circuit.

In a possible embodiment of the present disclosure, the charge pump further includes an input voltage control circuit. The voltage control method further includes: within each first voltage control time period, applying, by the input voltage control circuit, a first input voltage to the first input voltage end, and enabling, by the second output control circuit, the second end of the fourth energy storage circuit to be electrically disconnected from the voltage output end; and within each second voltage control time period, applying, by the input voltage control circuit, a second input voltage to the second input voltage end, and enabling, by the first output control circuit, the second end of the second energy storage circuit to be electrically disconnected from the voltage output end.

In a possible embodiment of the present disclosure, in a first step-up mode, the first charging step includes: at the first charging stage, enabling, by the first input control circuit, the first input voltage end to be electrically connected to the second end of the second energy storage circuit, enabling, by the first charging path control circuit, the second end of the first energy storage circuit to be electrically connected to the first end of the second energy storage circuit, and enabling, by the first voltage application control circuit, the first end of the first energy storage circuit to be electrically connected to a first voltage end, so as to form the charging paths that are from the first input voltage end to the first energy storage circuit and the second energy storage circuit and configured to charge the first energy storage circuit and the second energy storage circuit; and enabling, by the first output control circuit, the second end of the second energy storage circuit to be electrically disconnected from the voltage output end. The first output step includes: at the first output stage, enabling, by the first input control circuit, the first input voltage end to be electrically disconnected from the second end of the second energy storage circuit, enabling, by the first charging path control circuit, the second end of the first energy storage circuit to be electrically disconnected from the first end of the second energy storage circuit, and enabling, by the first voltage application control circuit, the first end of the first energy storage circuit to be electrically disconnected from the first voltage end; enabling, by the first input control circuit, the first end of the first energy storage circuit to be electrically connected to the first input voltage end, enabling, by the first charging path control circuit, the second end of the first energy storage circuit to be electrically connected to the second end of the second energy storage circuit, and enabling, by the first input control circuit, the first input voltage end to be electrically connected to the first end of the second energy storage circuit, so as to form the charging paths that are from the first input voltage end to the first energy storage circuit and the second energy storage circuit and configured to charge the first energy storage circuit and the second energy storage circuit; and enabling, by the first output control circuit, the second end of the second energy storage circuit to be electrically connected to the voltage output end.

In a possible embodiment of the present disclosure, in a second step-up mode, the first charging step includes: at the first charging stage, enabling, by the first input control circuit, the first input voltage end to be electrically connected to the second end of the second energy storage circuit, and enabling, by the first voltage application control circuit, the first end of the second energy storage circuit to be electrically connected to the second voltage end, so as to form the charging path that is from the first input voltage end to the second energy storage circuit and configured to charge the second energy storage circuit; enabling, by the first input control circuit, the first input voltage end to be electrically connected to the second end of the first energy storage circuit, and enabling, by the first voltage application control circuit, the first end of the first energy storage circuit to be electrically connected to the first voltage end, so as to form the charging path that is from the first input voltage end to the first energy storage circuit and configured to charge the first energy storage circuit; and enabling, by the first output control circuit, the second end of the second energy storage circuit to be electrically disconnected from the voltage output end. The first output step includes: at the first output stage, enabling, by the first input control circuit, the first input voltage end to be electrically disconnected from the second end of the second energy storage circuit, and enabling, by the first voltage application control circuit, the first end of the second energy storage circuit to be electrically disconnected from the second voltage end; enabling, by the first input control circuit, the first input voltage end to be electrically disconnected from the second end of the first energy storage circuit, and enabling, by the first voltage application control circuit, the first end of the first energy storage circuit to be electrically disconnected from the first voltage end; enabling, by the first input control circuit, the first input voltage end to be electrically connected to the first end of the second energy storage circuit, enabling, by the first input control circuit, the first input voltage end to be electrically connected to the first end of the first energy storage circuit, and enabling, by the first charging path control circuit, the second end of the first energy storage circuit to be electrically connected to the second end of the second energy storage circuit, so as to form the charging paths that are from the first input voltage end to the first energy storage circuit and the second energy storage circuit and configured to charge the first energy storage circuit and the second energy storage circuit; and enabling, by the first output control circuit, the second end of the second energy storage circuit to be electrically connected to the voltage output end.

In a possible embodiment of the present disclosure, in a third step-up mode, the first charging step includes: within a first charging time period of the first charging stage, enabling, by the first input control circuit, the first input voltage end to be electrically connected to the second end of the first energy storage circuit, and enabling, by the first voltage application control circuit, the first end of the first energy storage circuit to be electrically connected to the first voltage end, so as to form the charging path that is from the first input voltage end to the first energy storage circuit and configured to charge the first energy storage circuit, and enabling, by the first output control circuit, the second end of the second energy storage circuit to be electrically disconnected from the voltage output end; and within a second charging time period of the first charging stage, enabling, by the first input control circuit, the first input voltage end to be electrically disconnected from the second end of the first energy storage circuit, enabling, by the first voltage application control circuit, the first end of the first energy storage circuit to be electrically disconnected from the first voltage end, enabling, by the first input control circuit, the first input voltage end to be electrically connected to the first end of the first energy storage circuit, enabling, by the first charging path control circuit, the second end of the first energy storage circuit to be electrically connected to the second end of the second energy storage circuit and enabling, by the first voltage application control circuit, the first end of the second energy storage circuit to be electrically connected to the second voltage end so as to form the charging paths that are from the first input voltage end to the first energy storage circuit and the second energy storage circuit and configured to charge the first energy storage circuit and the second energy storage circuit, and enabling, by the first output control circuit, the second end of the second energy storage circuit to be electrically disconnected from the voltage output end. The first output step includes: at the first output stage, enabling, by the first input control circuit, the first input voltage end to be electrically disconnected from the first end of the first energy storage circuit, enabling, by the first charging path control circuit, the second end of the first energy storage circuit to be electrically disconnected from the second end of the second energy storage circuit, and enabling, by the first voltage application control circuit, the first end of the second energy storage circuit to be electrically disconnected from the second voltage end; and enabling, by the first input control circuit, the first input voltage end to be electrically connected to the first end of the second energy storage circuit, and enabling, by the first output control circuit, the second end of the second energy storage circuit to be electrically connected to the voltage output end, so as to form the charging path that is from the first input voltage end to the second energy storage circuit and configured to charge the second energy storage circuit, and apply a voltage to the voltage output end.

In a possible embodiment of the present disclosure, in a fourth step-up mode, the first charging step includes: within the first charging time period of the first charging stage, enabling, by the first input control circuit, the first input voltage end to be electrically connected to the second end of the first energy storage circuit and enabling, by the first voltage application control circuit, the first end of the first energy storage circuit to be electrically connected to the first voltage end so as to form the charging path that is from the first input voltage end to the first energy storage circuit and configured to charge the first energy storage circuit, and enabling, by the first output control circuit, the second end of the second energy storage circuit to be electrically disconnected from the voltage output end; and within the second charging time period of the first charging stage, enabling, by the first input control circuit, the first input voltage end to be electrically disconnected from the second end of the first energy storage circuit, enabling, by the first voltage application control circuit, the first end of the first energy storage circuit to be electrically disconnected from the first voltage end, enabling, by the first input control circuit, the first input voltage end to be electrically connected to the first end of the first energy storage circuit, enabling, by the first charging path control circuit, the second end of the first energy storage circuit to be electrically connected to the second end of the second energy storage circuit and enabling, by the first voltage application control circuit, the first end of the second energy storage circuit to be electrically connected to the second voltage end so as to form the charging paths that are from the first input voltage end to the first energy storage circuit and the second energy storage circuit and configured to charge the first energy storage circuit and the second energy storage circuit, and enabling, by the first output control circuit, the second end of the second energy storage circuit to be electrically disconnected from the voltage output end. The first output step includes: at the first output stage, enabling, by the first input control circuit, the first input voltage end to be electrically disconnected from the first end of the first energy storage circuit, enabling, by the first charging path control circuit, the second end of the first energy storage circuit to be electrically disconnected from the second end of the second energy storage circuit, and enabling, by the first voltage application control circuit, the first end of the second energy storage circuit to be electrically disconnected from the second voltage end; enabling, by the first input control circuit, the first input voltage end to be electrically connected to the first end of the first energy storage circuit, enabling, by the first charging path control circuit, the second end of the first energy storage circuit to be electrically connected to the first end of the second energy storage circuit, enabling, by the first voltage application control circuit, the first end of the second energy storage circuit to be electrically connected to the second voltage end, and enabling, by the first output control circuit, the second end of the second energy storage circuit to be electrically connected to the voltage output end, so as to form the charging paths that are from the first input voltage end to the first energy storage circuit and the second energy storage circuit and configured to charge the first energy storage circuit and the second energy storage circuit, and apply a voltage to the voltage output end.

In a possible embodiment of the present disclosure, in the first step-up mode, the second charging step includes: at the second charging stage, enabling, by the second input control circuit, the second input voltage end to be electrically connected to the second end of the fourth energy storage circuit, enabling, by the second charging path control circuit, the second end of the third energy storage circuit to be electrically connected to the first end of the fourth energy storage circuit and enabling, by the second voltage application control circuit, the first end of the third energy storage circuit to be electrically connected to the third voltage end, so as to form charging paths that are from the second input voltage end to the third energy storage circuit and the fourth energy storage circuit and configured to charge the third energy storage circuit and the fourth energy storage circuit; and enabling, by the second output control circuit, the second end of the fourth energy storage circuit to be electrically disconnected from the voltage output end. The second output step includes: at the second output stage, enabling, by the second input control circuit, the second input voltage end to be electrically disconnected from the second end of the fourth energy storage circuit, enabling, by the second charging path control circuit, the second end of the third energy storage circuit to be electrically disconnected from the first end of the fourth energy storage circuit, and enabling, by the second voltage application control circuit, the first end of the third energy storage circuit to be electrically disconnected from the third voltage end; enabling, by the second input control circuit, the first end of the third energy storage circuit to be electrically connected to the second input voltage end, enabling, by the second charging path control circuit, the second end of the third energy storage circuit to be electrically connected to the second end of the fourth energy storage circuit, and enabling, by the second input control circuit, the second input voltage end to be electrically connected to the first end of the fourth energy storage circuit, so as to form charging paths that are from the second input voltage end to the third energy storage circuit and the fourth energy storage circuit and configured to charge the third energy storage circuit and the fourth energy storage circuit; and enabling, by the second output control circuit, the second end of the fourth energy storage circuit to be electrically connected to the voltage output end.

In a possible embodiment of the present disclosure, in the second step-up mode, the second charging step includes: at the second charging stage, enabling, by the second input control circuit, the second input voltage end to be electrically connected to the second end of the fourth energy storage circuit, and enabling, by the second voltage application control circuit, the first end of the fourth energy storage circuit to be electrically connected to the fourth voltage end, so as to form the charging path that is from the second input voltage end to the fourth energy storage circuit and configured to charge the fourth energy storage circuit; enabling, by the second input control circuit, the second input voltage end to be electrically connected to the second end of the third energy storage circuit, and enabling, by the second voltage application control circuit, the first end of the third energy storage circuit to be electrically connected to the third voltage end, so as to form the charging path that is from the second input voltage end to the third energy storage circuit and configured to charge the third energy storage circuit; and enabling, by the second output control circuit, the second end of the fourth energy storage circuit to be electrically disconnected from the voltage output end. The second output step includes: at the second output stage, enabling, by the second input control circuit, the second input voltage end to be electrically disconnected from the second end of the fourth energy storage circuit, and enabling, by the second voltage application control circuit, the first end of the fourth energy storage circuit to be electrically disconnected from the fourth voltage end; enabling, by the second input control circuit, the second input voltage end to be electrically disconnected from the second end of the third energy storage circuit, and enabling, by the second voltage application control circuit, the first end of the third energy storage circuit to be electrically disconnected from the third voltage end; enabling, by the second input control circuit, the second input voltage end to be electrically connected to the first end of the fourth energy storage circuit, enabling, by the second input control circuit, the second input voltage end to be electrically connected to the first end of the third energy storage circuit, and enabling, by the second charging path control circuit, the second end of the third energy storage circuit to be electrically connected to the second end of the fourth energy storage circuit, so as to form the charging paths that are from the second input voltage end to the third energy storage circuit and the fourth energy storage circuit and configured to charge the third energy storage circuit and the fourth energy storage circuit; and enabling, by the second output control circuit, the second end of the fourth energy storage circuit to be electrically connected to the voltage output end.

In a possible embodiment of the present disclosure, in the third step-up mode, the second charging step includes: within the first charging time period of the second charging stage, enabling, by the second input control circuit, the second input voltage end to be electrically connected to the second end of the third energy storage circuit and enabling, by the second voltage application control circuit, the first end of the third energy storage circuit to be electrically connected to the third voltage end so as to form the charging path that is from the second input voltage end to the third energy storage circuit and configured to charge the third energy storage circuit, and enabling, by the second output control circuit, the second end of the fourth energy storage circuit to be electrically disconnected from the voltage output end; and within the second charging time period of the second charging stage, enabling, by the second input control circuit, the second input voltage end to be electrically disconnected from the second end of the third energy storage circuit, enabling, by the second voltage application control circuit, the first end of the third energy storage circuit to be electrically disconnected from the third voltage end, enabling, by the second input control circuit, the second input voltage end to be electrically connected to the first end of the third energy storage circuit, enabling, by the second charging path control circuit, the second end of the third energy storage circuit to be electrically connected to the second end of the fourth energy storage circuit and enabling, by the second voltage application control circuit, the first end of the fourth energy storage circuit to be electrically connected to the fourth voltage end so as to form the charging paths that are from the second input voltage end to the third energy storage circuit and the fourth energy storage circuit and configured to charge the third energy storage circuit and the fourth energy storage circuit, and enabling, by the second output control circuit, the second end of the fourth energy storage circuit to be electrically disconnected from the voltage output end. The second output step includes: at the second output stage, enabling, by the second input control circuit, the second input voltage end to be electrically disconnected from the first end of the third energy storage circuit, enabling, by the second charging path control circuit, the second end of the third energy storage circuit to be electrically disconnected from the second end of the fourth energy storage circuit, and enabling, by the second voltage application control circuit, the first end of the fourth energy storage circuit to be electrically disconnected from the second voltage end; and enabling, by the second input control circuit, the second input voltage end to be electrically connected to the first end of the fourth energy storage circuit, and enabling, by the first output control circuit, the second end of the fourth energy storage circuit to be electrically connected to the voltage output end, so as to form the charging path that is from the second input voltage end to the fourth energy storage circuit and configured to charge the fourth energy storage circuit, and apply a voltage to the voltage output end.

In a possible embodiment of the present disclosure, in the fourth step-up mode, the second charging step includes: within the first charging time period of the second charging stage, enabling, by the second input control circuit, the second input voltage end to be electrically connected to the second end of the third energy storage circuit and enabling, by the second voltage application control circuit, the first end of the third energy storage circuit to be electrically connected to the third voltage end so as to form the charging path that is from the second input voltage end to the third energy storage circuit and configured to charge the third energy storage circuit, and enabling, by the second output control circuit, the second end of the fourth energy storage circuit to be electrically disconnected from the voltage output end; and within the second charging time period of the second charging stage, enabling, by the second input control circuit, the second input voltage end to be electrically disconnected from the second end of the third energy storage circuit, enabling, by the second voltage application control circuit, the first end of the third energy storage circuit to be electrically disconnected from the third voltage end, enabling, by the second input control circuit, the second input voltage end to be electrically connected to the first end of the third energy storage circuit, enabling, by the second charging path control circuit, the second end of the third energy storage circuit to be electrically connected to the second end of the fourth energy storage circuit and enabling, by the second voltage application control circuit, the first end of the fourth energy storage circuit to be electrically connected to the fourth voltage end so as to form the charging paths that are from the second input voltage end to the third energy storage circuit and the fourth energy storage circuit and configured to charge the third energy storage circuit and the fourth energy storage circuit, and enabling, by the second output control circuit, the second end of the fourth energy storage circuit to be electrically disconnected from the voltage output end. The second output step includes: at the second output stage, enabling, by the second input control circuit, the second input voltage end to be electrically disconnected from the first end of the third energy storage circuit, enabling, by the second charging path control circuit, the second end of the third energy storage circuit to be electrically disconnected from the second end of the fourth energy storage circuit, and enabling, by the second voltage application control circuit, the first end of the fourth energy storage circuit to be electrically disconnected from the fourth voltage end; and enabling, by the second input control circuit, the second input voltage end to be electrically connected to the first end of the third energy storage circuit, enabling, by the second charging path control circuit, the second end of the third energy storage circuit to be electrically connected to the first end of the fourth energy storage circuit, enabling, by the second voltage application control circuit, the first end of the fourth energy storage circuit to be electrically connected to the fourth voltage end, and enabling, by the second output control circuit, the second end of the fourth energy storage circuit to be electrically connected to the voltage output end, so as to form the charging paths that are from the second input voltage end to the third energy storage circuit and the fourth energy storage circuit and configured to charge the third energy storage circuit and the fourth energy storage circuit, and apply a voltage to the voltage output end.

In yet another aspect, the present disclosure provides in some embodiments a display device including the above-mentioned charge pump.

BRIEF DESCRIPTION OF THE DRAWINGS

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort.

FIG. 6 is a flow chart of a voltage control method for the charge pump according to one embodiment of the present disclosure.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect/connected to" or "couple/coupled to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

Transistors in the embodiments of the present disclosure may be thin film transistors (TFTs), field effect transistors (FETs) or any other elements having a same characteristic. In order to differentiate two electrodes other than a gate electrode from each other, one of them may be called as first electrode, and the other may be called second electrode. In actual use, the first electrode may be a drain electrode while the second electrode may be a source electrode, or the first electrode may be a source electrode while the second electrode may be a drain electrode.

Figure 1:
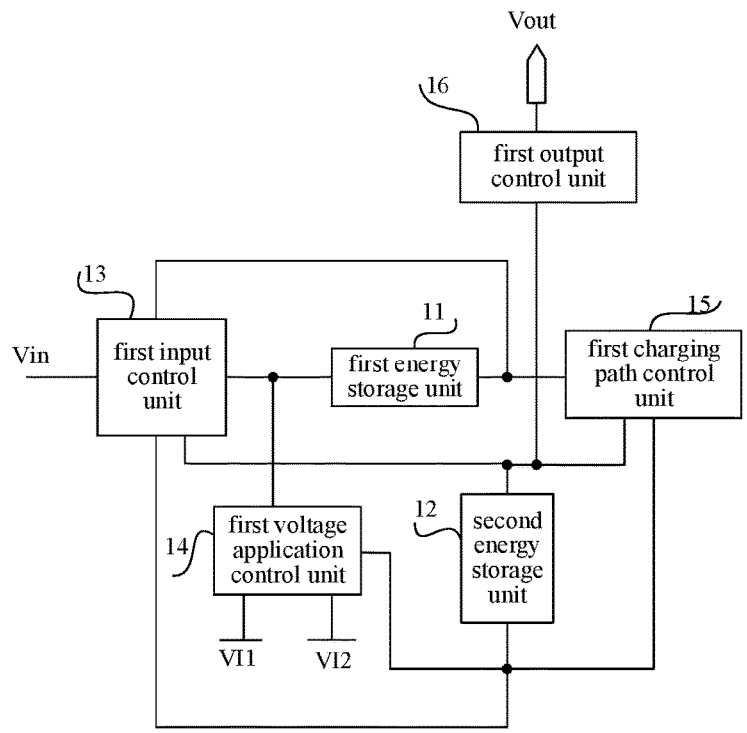
FIG. 1 is a block diagram of a charge pump according to one embodiment of the present disclosure.

As shown in FIG. 1, the present disclosure provides in some embodiments a charge pump which includes a voltage output end Vout and a first step-up circuitry. The first step-up circuitry includes a first input voltage end Vin, a first energy storage unit 11, a second energy storage unit 12, a first input control unit 13, a first voltage application control unit 14, a first charging path control unit 15, and a first output control unit 16. The first input control unit 13 is electrically connected to the first input voltage end Vin, a first end and a second end of the first energy storage unit 11, and a first end and a second end of the second energy storage unit 12, and configured to enable the first input voltage end Vin to be electrically connected to, or electrically disconnected from, the first end of the first energy storage unit 11, enable the first input voltage end Vin to be electrically connected to, or electrically disconnected from, the second end of the first energy storage unit 11, enable the first input voltage end Vin to be electrically connected to, or electrically disconnected from, the first end of the second energy storage unit 12, and enable the first input voltage end Vin to be electrically connected to, or electrically disconnected from, the second end of the second energy storage unit 12. The first voltage application control unit 14 is electrically connected to the first end of the first energy storage unit 11, the first end of the second energy storage unit 12, a first voltage end VI1 and a second voltage end VI2, and configured to enable the first end of the first energy storage unit 11 to be electrically connected to, or electrically disconnected from, the first voltage end VI1, and enable the first end of the second energy storage unit 12 to be electrically connected to, or electrically disconnected from, the second voltage end VI2. The first charging path control unit 15 is electrically connected to the second end of the first energy storage unit 11, the first end of the second energy storage unit 12 and the second end of the second energy storage unit 12, and configured to enable the second end of the first energy storage unit 11 to be electrically connected to, or electrically disconnected from, the first end of the second energy storage unit 12, and enable the second end of the first energy storage unit 11 to be electrically connected to, or electrically disconnected from, the second end of the second energy storage unit 12. The first output control unit 16 is electrically connected to the second end of the second energy storage unit 12 and the voltage output end Vout, and configured to enable the second end of the second energy storage unit to be electrically connected to, or electrically disconnected from, the voltage output end.

According to the charge pump in the embodiments of the present disclosure, the first step-up circuitry includes the first energy storage unit 11, the second energy storage unit 12, the first input control unit 13, the first voltage application control unit 14, the first charging path control unit 15 and the first output control unit 16. Through the first input control unit 13, the first voltage application control unit 14, the first charging path control unit 15 and the first output control unit 16, it is able to control different charging paths for the first energy storage unit 11 and/or the second energy storage unit 12, thereby to perform a step-up operation at a variable multiplication factor. As a result, it is able to prevent the occurrence of voltage declination due to a discharging process of a battery, thereby to ensure a stable voltage output even when a lithium battery is adopted by a small-size OLED display device.

In actual use, the first voltage end VI1 may be, but not limited to, the ground or a low voltage end, and a value of the voltage from the first voltage end VI1 may be selected according to the practical need.

In actual use, the second voltage end VI2 may be, but not limited to, the ground or a low voltage end, and a value of the voltage from the second voltage end VI2 may be selected according to the practical need.

Figure 2:
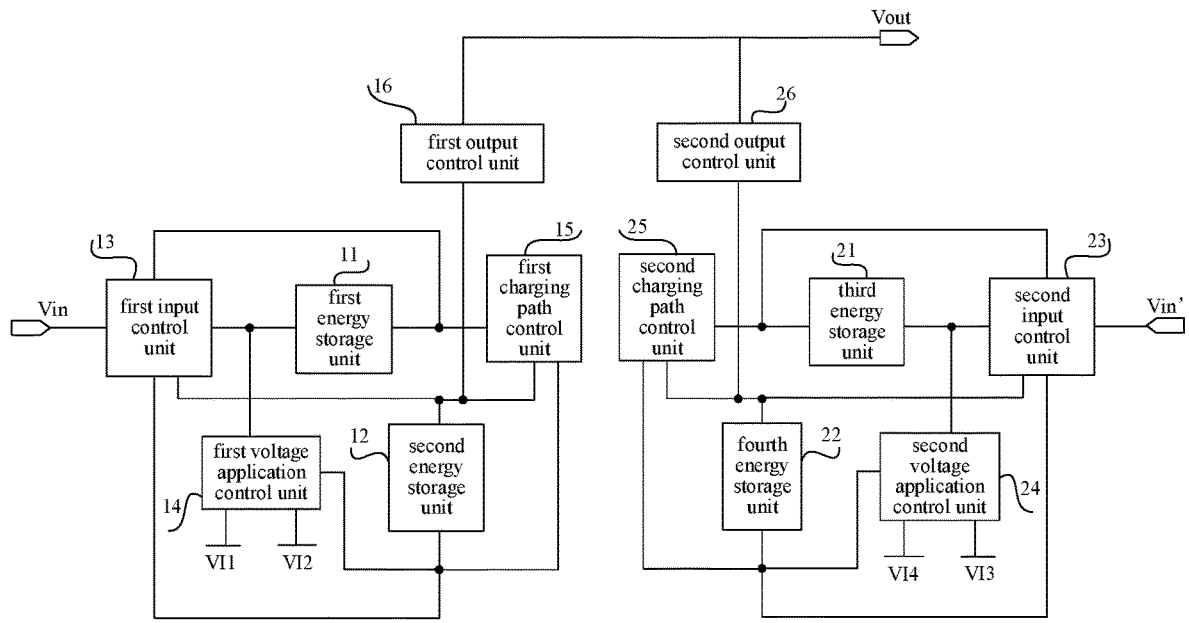
FIG. 2 is another block diagram of the charge pump according to one embodiment of the present disclosure.

In a possible embodiment of the present disclosure, as shown in FIG. 2, the charge pump may further include a second step-up circuitry.

The second step-up circuitry includes a second input voltage end Vin', a third energy storage unit 21, a fourth energy storage unit 22, a second input control unit 23, a second voltage application control unit 24, a second charging path control unit 25 and a second output control unit 26.

The second input control unit 23 is electrically connected to the second input voltage end Vin', a first end and a second end of the third energy storage unit 21, and a first end and a second end of the fourth energy storage unit 22, and configured to enable the second input voltage end Vin' to be electrically connected to, or electrically disconnected from, the first end of the third energy storage unit 21, enable the second input voltage end Vin' to be electrically connected to, or electrically disconnected from, the second end of the third energy storage unit 21, enable the second input voltage end Vin' to be electrically connected to, or electrically disconnected from, the first end of the fourth energy storage unit 22, and enable the second input voltage end Vin' to be electrically connected to, or electrically disconnected from, the second end of the fourth energy storage unit 22.

The second voltage application control unit 24 is electrically connected to the first end of the third energy storage unit 21, a third voltage end VI3, the first end of the fourth energy storage unit 22 and a fourth voltage end VI4, and configured to enable the first end of the third energy storage unit 21 to be electrically connected to, or electrically disconnected from, the third voltage end VI3, and enable the first end of the fourth energy storage unit 22 to be electrically connected to, or electrically disconnected from, the fourth voltage end VI4.

The second charging path control unit 25 is electrically connected to the second end of the third energy storage unit 21, and the first end and the second end of the fourth energy storage unit 22, and configured to enable the second end of the third energy storage unit 21 to be electrically connected to, or electrically disconnected from, the first end of the fourth energy storage unit 22, and enable the second end of the third energy storage unit 21 to be electrically connected to, or electrically disconnected from, the second end of the fourth energy storage unit 22.

The second output control unit 26 is electrically connected to the second end of the fourth energy storage unit 22 and the voltage output end Vout, and configured to enable the second end of the fourth energy storage unit 22 to be electrically connected to, or electrically disconnected from, the voltage output end Vout.

According to the embodiments of the present disclosure, the charge pump may further include the second step-up circuitry arranged symmetrical with the first step-up circuitry. Through alternate step-up operations using the first step-up circuitry and the second step-up circuitry, the first step-up circuitry and the second step-up circuitry may output the voltage to the voltage output end alternately, so as to charge an output capacitor (not shown in FIGS. 1 and 2, a positive plate of the output capacitor is electrically connected to Vout and a negative plate of the output capacitor is grounded or electrically connected to a low voltage end) alternately through Vin and Vin', thereby to reduce an output voltage ripple and output the voltage through Vout in a stable manner.

Figure 3:
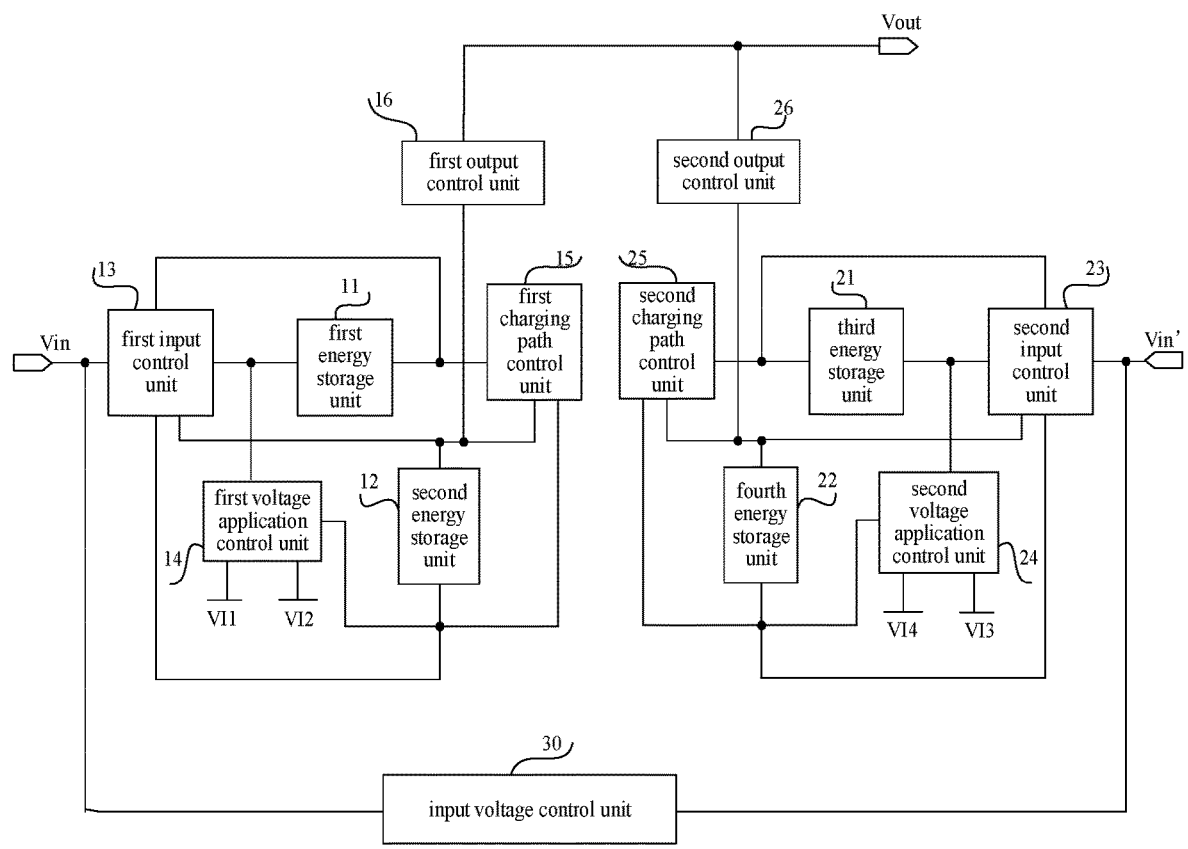
FIG. 3 is yet another block diagram of the charge pump according to one embodiment of the present disclosure.

To be specific, as shown in FIG. 3, on the basis of the structure in FIG. 2, the charge pump may further include an input voltage control unit 30 electrically connected to the first input voltage end Vin and the second input voltage end Vin' and configured to apply corresponding input voltages to the first input voltage end Vin and the second input voltage end Vin' alternately.

Through applying the corresponding input voltages to the first input voltage end Vin and the second input voltage end Vin' alternately using the input voltage control unit 30, it is able for the first step-up circuitry and the second step-up circuitry to output the voltages to the voltage output end Vout alternately.

To be specific, the first energy storage unit may include a first storage capacitor, a negative plate of which is the first end of the first energy storage unit, and a positive plate of which is the second end of the first energy storage unit. The second energy storage unit may include a second storage capacitor, a negative plate of which is the first end of the second energy storage unit, and a positive plate of which is the second end of the second energy storage unit. The first input control unit may include: a first input control transistor, wherein a first electrode of which is electrically connected to the first input voltage end, and a second electrode of which is electrically connected to the positive plate of the second storage capacitor; a second input control transistor, wherein a first electrode of which is electrically connected to the first input voltage end, and a second electrode of which is electrically connected to the negative plate of the first storage capacitor; a third input control transistor, wherein a first electrode of which is electrically connected to the first input voltage end, and a second electrode of which is electrically connected to the positive plate of the first storage capacitor; a fourth input control transistor, wherein a first electrode of which is electrically connected to the first input voltage end, and a second electrode of which is electrically connected to the negative plate of the second storage capacitor; and a first input control module electrically connected to gate electrodes of the first input control transistor, the second input control transistor, the third input control transistor and the fourth input control transistor, and configured to turn on or turn off the first input control transistor, the second input control transistor, the third input control transistor, and the fourth input control transistor.

To be specific, the first voltage application control unit may include: a first voltage application control transistor, wherein a first electrode of which is electrically connected to the negative plate of the first storage capacitor, and a second electrode of which is electrically connected to the first voltage end; a second voltage application control transistor, wherein a first electrode of which is electrically connected to the negative plate of the second storage capacitor, and a second electrode of which is electrically connected to the second voltage end; and a first voltage application control module electrically connected to a gate electrode of the first voltage application control transistor and a gate electrode of the second voltage application control transistor, and configured to turn on or turn off the first voltage application control transistor and the second voltage application control transistor. The first charging path control unit may include: a first charging path control transistor, wherein a first electrode of which is electrically connected to the positive plate of the first storage capacitor, and a second electrode of which is electrically connected to the positive plate of the second storage capacitor; a second charging path control transistor, wherein a first electrode of which is electrically connected to the positive plate of the first storage capacitor, and a second electrode of which is electrically connected to the negative plate of the second storage capacitor; and a first charging path control module electrically connected to a gate electrode of the first charging path control transistor and a gate electrode of the second charging path control transistor, and configured to turn on or turn off the first charging path control transistor and the second charging path control transistor. The first output control unit may include: a first output control transistor, wherein a first electrode of which is electrically connected to the positive plate of the second storage capacitor, and a second electrode of which is electrically connected to the voltage output end; and a first output control module electrically connected to a gate electrode of the first output control transistor and configured to turn on or turn off the first output control transistor.

To be specific, the third energy storage unit may include a third storage capacitor, a negative plate of which is the first end of the third energy storage unit and a positive plate of which is the second end of the third energy storage unit. The fourth energy storage unit may include a fourth storage capacitor, a negative plate of which is the first end of the fourth energy storage unit and a positive plate of which is the second end of the fourth energy storage unit. The second input control unit may include: a fifth input control transistor, wherein a first electrode of which is electrically connected to the second input voltage end, and a second electrode of which is electrically connected to the positive plate of the fourth storage capacitor; a sixth input control transistor, wherein a first electrode of which is electrically connected to the second input voltage end, and a second electrode of which is electrically connected to the negative plate of the third storage capacitor; a seventh input control transistor, wherein a first electrode of which is electrically connected to the second input voltage end, and a second electrode of which is electrically connected to the positive plate of the third storage capacitor; an eighth input control transistor, wherein a first electrode of which is electrically connected to the second input voltage end, and a second electrode of which is electrically connected to the negative plate of the fourth storage capacitor; and a second input control module electrically connected to gate electrodes of the fifth input control transistor, the sixth input control transistor, the seventh input control transistor and the eighth input control transistor, and configured to turn on or turn off the fifth input control transistor, the sixth input control transistor, the seventh input control transistor and the eighth input control transistor.

To be specific, the second voltage application control unit may include: a third voltage application control transistor, wherein a first electrode of which is electrically connected to the negative plate of the third storage capacitor, and a second electrode of which is electrically connected to the third voltage end; a fourth voltage application control transistor, wherein a first electrode of which is electrically connected to the negative plate of the fourth storage capacitor, and a second electrode of which is electrically connected to the fourth voltage end; and a second voltage application control module electrically connected to gate electrodes of the third voltage application control transistor and the fourth voltage application control transistor, and configured to turn on or turn off the third voltage application control transistor and the fourth voltage application control transistor. The second charging path control unit may include: a third charging path control transistor, wherein a first electrode of which is electrically connected to the positive plate of the third storage capacitor, and a second electrode of which is electrically connected to the positive plate of the fourth storage capacitor; a fourth charging path control transistor, a first electrode of which is electrically connected to the positive plate of the third storage capacitor, and a second electrode of which is electrically connected to the negative plate of the fourth storage capacitor; and a second charging path control module electrically connected to gate electrodes of the third charging path control transistor and the fourth charging path control transistor, and configured to turn on or turn off the third charging path control transistor and the fourth charging path control transistor. The second output control unit may include: a second output control transistor, wherein a first electrode of which is electrically connected to the positive plate of the fourth storage capacitor, and a second electrode of which is electrically connected to the voltage output end; and a second output control module electrically connected to a gate electrode of the second output control transistor, and configured to turn on or turn off the second output control transistor.

To be specific, the charge pump may further include: an output capacitor, wherein a positive plate of which is electrically connected to the voltage output end, and a negative plate of which is electrically connected to a fifth voltage end; and a switch control unit electrically connected to the first end of the second energy storage unit and the second end of the fourth energy storage unit, and configured to enable the first end of the second energy storage unit to be electrically connected to, or electrically disconnected from, the second end of the fourth energy storage unit.

In actual use, the fifth voltage end electrically connected to the negative plate of the output capacitor may be, but not limited to, a low voltage end or the ground.

The switch control unit is configured to enable the first step-up circuitry to be electrically connected to, or electrically disconnected from, the second step-up circuitry. When the first step-up circuitry is electrically disconnected from the second step-up circuitry, they may operate alternately. When the first step-up circuitry is electrically connected to the second step-up circuitry, they may together form a step-up module and operate simultaneously.

The charge pump will be described hereinafter in conjunction with the embodiments.

Figure 4:
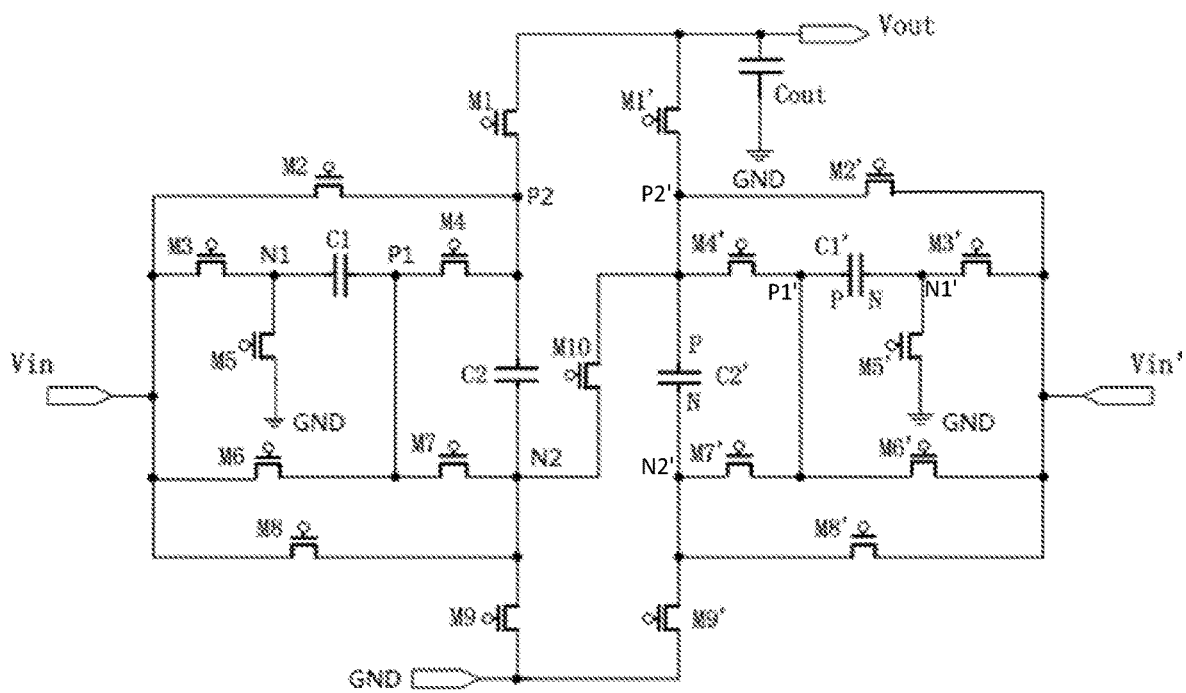
FIG. 4 is a circuitry diagram of the charge pump according to one embodiment of the present disclosure.

As shown in FIG. 4, the charge pump includes a voltage output end Vout, a first step-up circuitry, a second step-up circuitry, an output capacitor Cout, a switch control unit and an input voltage control unit (not shown).

The first step-up circuitry includes a first input voltage end Vin, a first energy storage unit, a second energy storage unit, a first input control unit, a first voltage application control unit, a first output control unit and a first charging path control unit. The second step-up circuitry includes a second input voltage end Vin', a third energy storage unit, a fourth energy storage unit, a second input control unit, a second voltage application control unit, a second output control unit and a second charging path control unit.

Figure 5:
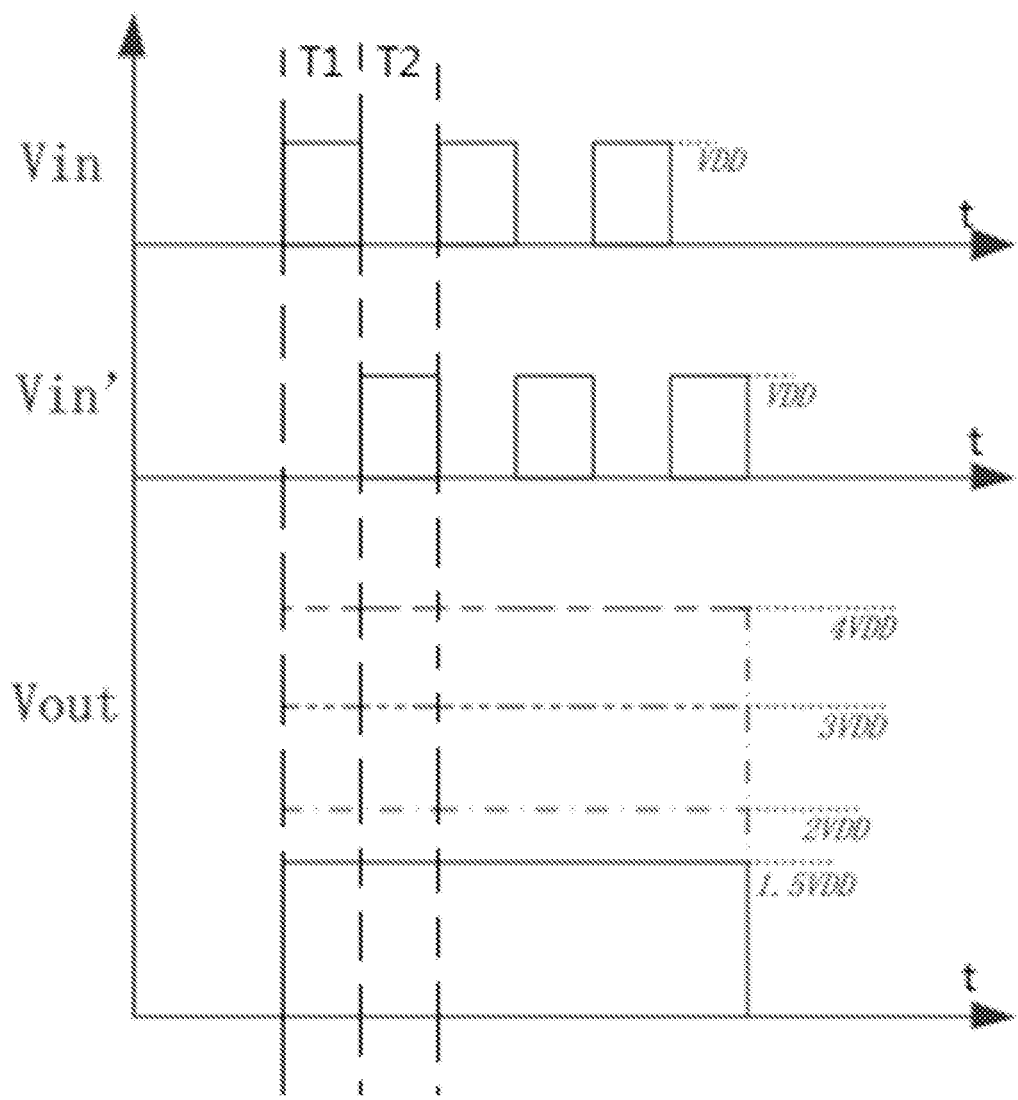
FIG. 5 is a sequence diagram of an input voltage and an output voltage for the charge pump according to one embodiment of the present disclosure.

The input voltage control unit is electrically connected to the first input voltage end Vin and the second input voltage end Vin', and configured to apply corresponding input voltages to the first input voltage end Vin and the second input voltage end Vin' alternately (FIG. 5 shows a sequence diagram of the voltage applied to Vin, the voltage applied to Vin', and the voltage from Vout).

Through applying the input voltages to the first input voltage end Vin and the second input voltage end Vin' alternately using the input voltage control unit 30, it is able for the first step-up circuitry and the second step-up circuitry to output voltages to the voltage output end Vout alternately through the first step-up circuitry and the second step-up circuitry.

The first energy storage unit includes a first storage capacitor C1, wherein a negative plate of which is a first end of the first energy storage unit, and a positive plate of which is a second end of the first energy storage unit. The positive plate of the first storage capacitor C1 is electrically connected to a first positive node P1, the negative plate of the first storage capacitor C1 is electrically connected to a first negative node N1, the positive plate of the second storage capacitor C2 is electrically connected to a second positive node P2, and the negative plate of the second storage capacitor C2 is electrically connected to a second negative node N2. The second energy storage unit includes a second storage capacitor C2, a negative plate of which is a first end of the second energy storage unit, and a positive plate of which is a second end of the second energy storage unit.

The first input control unit includes: a first input control transistor M2, wherein a drain electrode of which is electrically connected to the first input voltage end Vin, and a source electrode of which is electrically connected to the positive plate of the second storage capacitor C2; a second input control transistor M3, wherein a drain electrode of which is electrically connected to the first input voltage end Vin, and a source electrode of which is electrically connected to the negative plate of the first storage capacitor C1; a third input control transistor M6, wherein a drain electrode of which is electrically connected to the first input voltage end Vin, and a source electrode of which is electrically connected to the positive plate of the first storage capacitor C1; a fourth input control transistor M8, wherein a drain electrode of which is electrically connected to the first input voltage end Vin, and a source electrode of which is electrically connected to the negative plate of the second storage capacitor C2; and a first input control module (not shown) electrically connected to gate electrodes of the first input control transistor M2, the second input control transistor M3, the third input control transistor M6 and the fourth input control transistor M8, and configured to turn on or turn off the first input control transistor M2, the second input control transistor M3, the third input control transistor M6, and the fourth input control transistor M8.

The first voltage application control unit includes: a first voltage application control transistor M5, wherein a drain electrode of which is electrically connected to the negative plate of the first storage capacitor C1, and a source electrode of which is electrically connected to the ground GND; a second voltage application control transistor M9, wherein a drain electrode of which is electrically connected to the negative plate of the second storage capacitor C2, and a source electrode of which is electrically connected to the ground GND; and a first voltage application control module (not shown in FIG. 4) electrically connected to a gate electrode of the first voltage application control transistor M5 and a gate electrode of the second voltage application control transistor M9, and configured to turn on or turn off the first voltage application control transistor M5 and the second voltage application control transistor M9.

The first charging path control unit includes: a first charging path control transistor M4, wherein a drain electrode of which is electrically connected to the positive plate of the first storage capacitor C1, and a source electrode of which is electrically connected to the positive plate of the second storage capacitor C2; a second charging path control transistor M7, wherein a drain electrode of which is electrically connected to the positive plate of the first storage capacitor C1, and a source electrode of which is electrically connected to the negative plate of the second storage capacitor C2; and a first charging path control module (not shown in FIG. 4) electrically connected to a gate electrode of the first charging path control transistor M4 and a gate electrode of the second charging path control transistor M7, and configured to turn on or turn off the first charging path control transistor M4 and the second charging path control transistor M7.

The first output control unit includes: a first output control transistor M1, wherein a drain electrode of which is electrically connected to the positive plate of the second storage capacitor C2, and a source electrode of which is electrically connected to the voltage output end Vout; and a first output control module (not shown in FIG. 4) electrically connected to a gate electrode of the first output control transistor M1 and configured to turn on or turn off the first output control transistor M1.

The third energy storage unit includes a third storage capacitor C1', wherein a negative plate of which is the first end of the third energy storage unit and a positive plate of which is the second end of the third energy storage unit. The fourth energy storage unit includes a fourth storage capacitor C2', a negative plate of which is the first end of the fourth energy storage unit and a positive plate of which is the second end of the fourth energy storage unit. The positive plate of the third storage capacitor C1' is electrically connected to a third positive node P1', the negative plate of the third storage capacitor C1' is electrically connected to a third negative node N1', the positive plate of the fourth storage capacitor C2' is electrically connected to a fourth positive node P2', and the negative plate of the fourth storage capacitor C2' is electrically connected to a fourth negative node N2'.

The second input control unit includes: a fifth input control transistor M2', wherein a drain electrode of which is electrically connected to the second input voltage end Vin', and a source electrode of which is electrically connected to the positive plate of the fourth storage capacitor C2'; a sixth input control transistor M3', wherein a drain electrode of which is electrically connected to the second input voltage end Vin', and a source electrode of which is electrically connected to the negative plate of the third storage capacitor C1'; a seventh input control transistor M6', wherein a first electrode of which is electrically connected to the second input voltage end Vin', and a source electrode of which is electrically connected to the positive plate of the third storage capacitor C1'; an eighth input control transistor M8', wherein a drain electrode of which is electrically connected to the second input voltage end Vin', and a source electrode of which is electrically connected to the negative plate of the fourth storage capacitor C2'; and a second input control module (not shown in FIG. 4) electrically connected to gate electrodes of the fifth input control transistor M2', the sixth input control transistor M3', the seventh input control transistor M6' and the eighth input control transistor M8', and configured to turn on or turn off the fifth input control transistor M2', the sixth input control transistor M3', the seventh input control transistor M6' and the eighth input control transistor M8'.

The second voltage application control unit includes: a third voltage application control transistor M5', wherein a drain electrode of which is electrically connected to the negative plate of the third storage capacitor C1', and a source electrode of which is electrically connected to the ground GND; a fourth voltage application control transistor M9', wherein a drain electrode of which is electrically connected to the negative plate of the fourth storage capacitor C2', and a source electrode of which is electrically connected to the ground GND; and a second voltage application control module (not shown in FIG. 4) electrically connected to gate electrodes of the third voltage application control transistor M5' and the fourth voltage application control transistor M9', and configured to turn on or turn off the third voltage application control transistor M5' and the fourth voltage application control transistor M9'.

The second charging path control unit includes: a third charging path control transistor M4', wherein a drain electrode of which is electrically connected to the positive plate of the third storage capacitor C1', and a source electrode of which is electrically connected to the positive plate of the fourth storage capacitor C2'; a fourth charging path control transistor M7', wherein a drain electrode of which is electrically connected to the positive plate of the third storage capacitor C1', and a source electrode of which is electrically connected to the negative plate of the fourth storage capacitor C2'; and a second charging path control module (not shown in FIG. 4) electrically connected to gate electrodes of the third charging path control transistor M4' and the fourth charging path control transistor M7', and configured to turn on or turn off the third charging path control transistor M4' and the fourth charging path control transistor M7'.

The second output control unit includes: a second output control transistor M1', wherein a drain electrode of which is electrically connected to the positive plate of the fourth storage capacitor C2', and a source electrode of which is electrically connected to the voltage output end Vout; and a second output control module (not shown in FIG. 4) electrically connected to a gate electrode of the second output control transistor M1', and configured to turn on or turn off the second output control transistor M1'.

A positive plate of the output capacitor Cout is electrically connected to the voltage output end Vout, and a negative plate of the output capacitor Cout is electrically connected to the ground GND.

The switch control unit includes: a switch control transistor M10, wherein a drain electrode of which is electrically connected to the positive plate of the fourth storage capacitor C2' and a source electrode of which is electrically connected to the negative plate of the second storage capacitor C2; and a switch control module (not shown in FIG. 4) electrically connected to a gate electrode of the switch control transistor M10 and configured to turn on or turn off the switch control transistor M10. When the first step-up circuitry and the second step-up circuitry need to operate alternately, the switch control transistor M10 of the switch control module may be turned off.

In FIG. 4, all the transistors are n-type transistors. However, in actual use, the transistors may alternatively be p-type transistors, i.e., the types of the transistors will not be particularly defined herein. In addition, the first voltage end, the second voltage end, the third voltage end, the fourth voltage end and the fifth voltage end may be, but not limited to, the ground. Capacitances of the first storage capacitor C1, the second storage capacitor C2, the third storage capacitor C1' and the fourth storage capacitor C2' may each be 1 μF, and a capacitance of Cout may be 4.7 μF. It should be appreciated that the capacitances of the capacitors will not be particularly defined herein.

During the operation of the charge pump in FIG. 4, operation procedures corresponding to different multiplication factors will be described hereinafter.

In a first step-up mode (the first step-up module corresponding to a multiplication factor of 1.5), as shown in FIG. 5 (where a horizontal axis represents time t), within a first voltage control time period T1, a high voltage VDD is applied to Vin, and no voltage is applied to Vin', so M1' is turned off.

At a first charging stage of the first voltage control time period T1, M2, M7 and M5 are all turned on to form an electrical path through M2, C2, M7, C1 and M5, and the other transistors are turned off. At this time, C1 and C2 are charged through Vin, VP2=VDD, VN2=VP1=VDD/2, and VN1=0, where VP2 represents a potential at the second positive node P2, VN2 represents a potential at the second negative node N2, VP1 represents a potential at the first positive node P1, and VN1 represents a potential at the first negative node N1.

At a first output stage of the first voltage control time period T1, M1, M3, M4 and M8 are all turned on, and the other transistors are turned off. At this time, VN1=VN2=VDD. There is no voltage jump at two ends of each of the capacitors, so VO=VP1=VP2=0.5 VDD, where VO represents a voltage from Vout.

Within a second voltage control time period T2, the high voltage VDD is applied to Vin', and no voltage is applied to Vin, so M1 is turned off.

At a second charging stage of the second voltage control time period T2, M2', M7' and M5' are all turned on to form an electrically path through M2', C2', M7', C1' and M5', and the other transistors are turned off. At this time, C1' and C2' are charged through Vin', VP2'=VDD, VN2'=VP'=VDD/2, and VN1'=0, where VP2' represents a potential at the fourth positive node P2', VN2' represents a potential at the fourth negative node N2', VP1' represents a potential at the third positive node P1', and VN1' represents a potential at the third negative node N1'.

At a second output stage of the second voltage control time period T2, M1', M3', M4' and M8' are turned on, and the other transistors are turned off. At this time, VN1'=VN2'=VDD. There is no voltage jump at two ends of each capacitor, so VO=VP1'=VP2'=1.5 VDD, where VO represents the voltage from Vout.

In a second step-up mode (the second step-up module corresponding to a multiplication factor of 2), as shown in FIG. 5, within the first voltage control time period T1, the high voltage VDD is applied to Vin, and no voltage is applied to Vin', so M1' is turned off.

At the first charging stage of the first voltage control time period T1, M2 and M9 are both turned on to form an electrical path through M2, C2 and M9, M6 and M5 are both turned on to form an electrical path through M6, C1 and M5, and the other transistors are turned off. At this time, C2 and C1 are charged through Vin, so that VN1=VN2=0, and VP1=VP2=VDD.

At the first output stage of the first voltage control time period T1, M8, M3, M4 and M1 are all turned on, and the other transistors are turned off. At this time, VN1=VN2=VDD. There is no voltage jump at two ends of each capacitor, so VO=VP1=VP2=2 VDD, where VO represents the voltage from Vout.

Within the second voltage control time period T2, the high voltage VDD is applied to Vin', and no voltage is applied to Vin, so M1 is turned off.

At the second charging stage of the second voltage control time period T2, M2' and M9' are both turned on to form an electrical path through M2', C2' and M9', M6' and M5' are both turned on to form an electrical path through M6', C1' and M5', and the other transistors are turned off. At this time, C2' and C1' are charged through Vin', so that VN1'=VN2'=0, and VP1'=VP2'=VDD.

At the second output stage of the second voltage control time period T2, M8', M3', M4' and M1' are all turned on, and the other transistors are turned off. At this time, VN1'=VN2'=VDD. There is no voltage jump at two ends of each capacitor, so VO=VP1'=VP2'=2 VDD, where VO represents the voltage from Vout.

In a third step-up mode (the third step-up module corresponding a multiplication factor of 3), as shown in FIG. 5, within the first voltage control time period T1, the high voltage VDD is applied to Vin, and no voltage is applied to Vin', so M1' is turned off.

Within the first charging time period of the first charging stage of the first voltage control time period T1, M6 and M5 are both turned on, and the other transistors are turned off. At this time, C1 is charged through Vin, so VN1=0, and VP1=VDD.

Within the second charging time period of the first charging stage of the first voltage control time period T1, M3, M4 and M9 are turned on, and the other transistors are turned off. At this time, VN2=0, VN1=VDD, and VP1 is doubled to be 2 VDD. In addition, C2 is charged, so that VP2=2 VDD.

At the first output stage of the first voltage control time period T1, M8 and M1 are both turned on, and the other transistors are turned off. At this time, VN2=VDD. There is no voltage jump at two ends of each capacitor, so Vout=VP2=3 VDD.

Within the second voltage control time period T2, the high voltage VDD is applied to Vin', and no voltage is applied to Vin, so M1 is turned off.

Within the first charging time period of the second charging stage of the second voltage control time period T2, M6' and M5' are both turned on, and the other transistors are turned off. At this time, C1' is charged through Vin', VN1'=0, and VP1'=VDD.

Within the second charging time period of the second charging stage of the second voltage control time period T2, M3', M4' and M9' are turned on, and the other transistors are turned off. At this time, VN2'=0, VN1'=VDD, and VP1' is doubled to be 2 VDD. In addition, C2' is charged, so that VP2'=2 VDD.

At the second output stage of the second voltage control time period T2, M8' and M1' are turned on, and the other transistors are turned off. At this time, VN2'=VDD. There is no voltage jump at two ends of each capacitor, so Vout=VP2'=3 VDD.

In a fourth step-up mode (the fourth step-up module corresponding a multiplication factor of 4), as shown in FIG. 5, within the first voltage control time period T1, the high voltage VDD is applied to Vin, and no voltage is applied to Vin', so M1' is turned off.

Within the first charging time period of the first charging stage of the first voltage control time period T1, M6 and M5 are turned on, and the other transistors are turned off. At this time, C1 is charged through Vin, VN1=0, and VP1=VDD.

Within the second charging time period of the first charging stage of the first voltage control time period T1, M3, M4 and M9 are turned on, and the other transistors are turned off. At this time, VN2=0, VN1=VDD, and VP1 is doubled to be 2 VDD. In addition, C2 is charged, so that VP2=2 VDD.

At the first output stage of the first voltage control time period T1, M3, M2, M7 and M1 are all turned on to form an electrical path through M3, C1, M7, C2 and M1, and the other transistors are turned off. At this time, VP1 is maintained to be equal to 2 VDD. In addition, C2 is charged, so that VN2=2 VDD. There is no voltage jump at two ends of each capacitor, Vout=VP2=4 VDD.

Within the second voltage control time period T2, the high voltage VDD is applied to Vin', and no voltage is applied to Vin, so M1 is turned off.

Within the first charging time period of the second charging stage of the second voltage control time period T2, M6' and M5' are turned on, and the other transistors are turned off. At this time, C1' is charged through Vin', VN1'=0, and VP1'=VDD.

Within the second charging time period of the second charging stage of the second voltage control time period T2, M3', M4' and M9' are all turned on, and the other transistors are turned off. At this time, VN2'=0, VN1'=VDD, and VP1' is doubled to be 2 VDD. In addition, C2' is charged, so that VP2'=2 VDD.

At the second output stage of the second voltage control time period T2, M3', M2', M7' and M1' are all turned on to form an electrical path through M3', C1', M7', C2' and M1', and the other transistors are turned off. At this time, VP1' is maintained to be equal to 2 VDD. In addition, C2' is charged, so that VN2'=2 VDD. There is no voltage jump at two ends of each capacitor, so Vout=VP2'=4 VDD.

During the operation of the charge pump in FIG. 4, the output capacitor Cout is charged alternately through Vin and Vin', so as to reduce the voltage ripple, thereby to enable Vout to output the voltage in stable manner.

The present disclosure further provides in some embodiments a voltage control method for the above-mentioned charge pump. As shown in FIG. 6, within a first voltage control time period, the voltage control method includes: a first charging step 601 of, at a first charging stage, controlling, by at least one of a first input control unit, a first voltage application control unit and a first charging path control unit, a charging path from a first input voltage end to a first energy storage unit, controlling, by at least one of the first input control unit, the first voltage application control unit and the first charging path control unit, a charging path from the first input voltage end to a second energy storage unit, and enabling, by a first output control unit, a second end of the second energy storage unit to be electrically disconnected from a voltage output end; and a first output step 602 of, at a first output stage, enabling, by the first output control unit, the second end of the second energy storage unit to be electrically connected to the voltage output end, and at a first output stage, controlling, by at least one of the first input control unit, the first voltage application control unit and the first charging path control unit, charging paths from the first input voltage end to the first energy storage unit and the second energy storage unit, or a charging path from the first input voltage end to the second energy storage unit.

According to the voltage control method in the embodiments of the present disclosure, the first step-up circuitry of the charge pump includes the first energy storage unit, the second energy storage unit, the first input control unit, the first voltage application control unit, the first charging path control unit and the first output control unit. Through the first input control unit, the first voltage application control unit, the first charging path control unit and the first output control unit, it is able to control different charging paths for the first energy storage unit and/or the second energy storage unit, thereby to perform a step-up operation at a variable multiplication factor. As a result, it is able to prevent the occurrence of output voltage declination due to a discharging process of a battery, thereby to ensure a stable voltage output even when a lithium battery is adopted by a small-size OLED display device.

In a possible embodiment of the present disclosure, the charge pump further includes a second step-up circuitry, and the second step-up circuitry includes a second input voltage end, a third energy storage unit, a fourth energy storage unit, a second input control unit, a second voltage application control unit, a second output control unit and a second charging path control unit. Each step-up period includes first voltage control time periods and second voltage control time periods arranged alternately. With each second voltage control time period, the voltage control method further includes: a second charging step of, at a second charging stage, controlling, by at least one of the second input control unit, the second voltage application control unit and the second charging path control unit, a charging path from a second input voltage end to the third energy storage unit, controlling, by at least one of the second input control unit, the second voltage application control unit and the second charging path control unit, a charging path from the second input voltage end to the fourth energy storage unit, and enabling, by the second output control unit, a second end of the fourth energy storage unit to be electrically disconnected from the voltage output end; and a second output step of, at a second output stage, enabling, by the second output control unit, the second end of the fourth energy storage unit to be electrically connected to the voltage output end, and at the second output stage, controlling, by at least one of the second input control unit, the second voltage application control unit and the second charging path control unit, charging paths from the second input voltage end to the third energy storage unit and the fourth energy storage unit, or a charging path from the second input voltage end to the fourth energy storage unit.

In a possible embodiment of the present disclosure, the charge pump may further include a second step-up circuitry arranged symmetrical with the first step-up circuitry. Through alternate step-up operations using the first step-up circuitry and the second step-up circuitry, the first step-up circuitry and the second step-up circuitry may output the voltage to the voltage output end alternately, so as to charge an output capacitor (illustratively but not restrictively, a positive plate of the output capacitor is electrically connected to the voltage output end, and a negative plate of the output capacitor is grounded or electrically connected to a low voltage end) through the first input voltage end and the second input voltage end alternately, thereby to reduce an output voltage ripple and output the voltage through the voltage output end in a stable manner.

To be specific, the charge pump further includes an input voltage control unit. The voltage control method further includes: within the first voltage control time period, applying, by the input voltage control unit, a first input voltage to the first input voltage end, and enabling, by the second output control unit, the second end of the fourth energy storage unit to be electrically disconnected from the voltage output end; and within the second voltage control time period, applying, by the input voltage control unit, a second input voltage to the second input voltage end, and enabling, by the first output control unit, the second end of the second energy storage unit to be electrically disconnected from the voltage output end.

In actual use, the input voltage control unit may apply the input voltage to the first input voltage end and the second input voltage end alternately, and the first voltage control time periods and the second voltage control time periods may be arranged alternately.

To be specific, in a first step-up mode, the first charging step includes: at the first charging stage, enabling, by the first input control unit, the first input voltage end to be electrically connected to the second end of the second energy storage unit, enabling, by the first charging path control unit, the second end of the first energy storage unit to be electrically connected to the first end of the second energy storage unit, and enabling, by the first voltage application control unit, the first end of the first energy storage unit to be electrically connected to a first voltage end, so as to form the charging paths from the first input voltage end to the first energy storage unit and the second energy storage unit; and enabling, by the first output control unit, the second end of the second energy storage circuit to be electrically disconnected from the voltage output end. The first output step includes: at the first output stage, enabling, by the first input control unit, the first input voltage end to be electrically disconnected from the second end of the second energy storage unit, enabling, by the first charging path control unit, the second end of the first energy storage unit to be electrically disconnected from the first end of the second energy storage unit, and enabling, by the first voltage application control unit, the first end of the first energy storage unit to be electrically disconnected from the first voltage end; enabling, by the first input control unit, the first end of the first energy storage unit to be electrically connected to the first input voltage end, enabling, by the first charging path control unit, the second end of the first energy storage unit to be electrically connected to the second end of the second energy storage unit, and enabling, by the first input control unit, the first input voltage end to be electrically connected to the first end of the second energy storage unit, so as to form the charging paths from the first input voltage end to the first energy storage unit and the second energy storage unit; and enabling, by the first output control unit, the second end of the second energy storage unit to be electrically connected to the voltage output end.

To be specific, in a second step-up node, the first charging step includes: at the first charging stage, enabling, by the first input control unit, the first input voltage end to be electrically connected to the second end of the second energy storage unit, and enabling, by the first voltage application control unit, the first end of the second energy storage unit to be electrically connected to the second voltage end, so as to form the charging path from the first input voltage end to the second energy storage unit; enabling, by the first input control unit, the first input voltage end to be electrically connected to the second end of the first energy storage unit, and enabling, by the first voltage application control unit, the first end of the first energy storage unit to be electrically connected to the first voltage end, so as to form the charging path from the first input voltage end to the first energy storage unit; and enabling, by the first output control unit, the second end of the second energy storage unit to be electrically disconnected from the voltage output end. The first output step includes: at the first output stage, enabling, by the first input control unit, the first input voltage end to be electrically disconnected from the second end of the second energy storage unit, and enabling, by the first voltage application control unit, the first end of the second energy storage unit to be electrically disconnected from the second voltage end; enabling, by the first input control unit, the first input voltage end to be electrically disconnected from the second end of the first energy storage unit, and enabling, by the first voltage application control unit, the first end of the first energy storage unit to be electrically disconnected from the first voltage end; enabling, by the first input control unit, the first input voltage end to be electrically connected to the first end of the second energy storage unit, enabling, by the first input control unit, the first input voltage end to be electrically connected to the first end of the first energy storage unit, and enabling, by the first charging path control unit, the second end of the first energy storage unit to be electrically connected to the second end of the second energy storage unit, so as to form the charging paths from the first input voltage end to the first energy storage unit and the second energy storage unit; and enabling, by the first output control unit, the second end of the second energy storage unit to be electrically connected to the voltage output end.

To be specific, in a third step-up mode, the first charging step includes: within a first charging time period of the first charging stage, enabling, by the first input control unit, the first input voltage end to be electrically connected to the second end of the first energy storage unit and enabling, by the first voltage application control unit, the first end of the first energy storage unit to be electrically connected to the first voltage end, so as to form the charging path from the first input voltage end to the first energy storage unit, and enabling, by the first output control unit, the second end of the second energy storage unit to be electrically disconnected from the voltage output end; and within a second charging time period of the first charging stage, enabling, by the first input control unit, the first input voltage end to be electrically disconnected from the second end of the first energy storage unit, enabling, by the first voltage application control unit, the first end of the first energy storage unit to be electrically disconnected from the first voltage end, enabling, by the first input control unit, the first input voltage end to be electrically connected to the first end of the first energy storage unit, enabling, by the first charging path control unit, the second end of the first energy storage unit to be electrically connected to the second end of the second energy storage unit, and enabling, by the first voltage application control unit, the first end of the second energy storage unit to be electrically connected to the second voltage end so as to form the charging paths from the first input voltage end to the first energy storage unit and the second energy storage unit, and enabling, by the first output control unit, the second end of the second energy storage unit to be electrically disconnected from the voltage output end. The first output step includes: at the first output stage, enabling, by the first input control unit, the first input voltage end to be electrically disconnected from the first end of the first energy storage unit, enabling, by the first charging path control unit, the second end of the first energy storage unit to be electrically disconnected from the second end of the second energy storage unit, and enabling, by the first voltage application control unit, the first end of the second energy storage unit to be electrically disconnected from the second voltage end; and enabling, by the first input control unit, the first input voltage end to be electrically connected to the first end of the second energy storage unit, and enabling, by the first output control unit, the second end of the second energy storage unit to be electrically connected to the voltage output end, so as to form the charging path from the first input voltage end to the second energy storage unit, and apply a voltage to the voltage output end.

To be specific, in a fourth step-up mode, the first charging step includes: within the first charging time period of the first charging stage, enabling, by the first input control unit, the first input voltage end to be electrically connected to the second end of the first energy storage unit and enabling, by the first voltage application control unit, the first end of the first energy storage unit to be electrically connected to the first voltage end so as to form the charging path from the first input voltage end to the first energy storage unit, and enabling, by the first output control unit, the second end of the second energy storage unit to be electrically disconnected from the voltage output end; and within the second charging time period of the first charging stage, enabling, by the first input control unit, the first input voltage end to be electrically disconnected from the second end of the first energy storage unit, enabling, by the first voltage application control unit, the first end of the first energy storage unit to be electrically disconnected from the first voltage end, enabling, by the first input control unit, the first input voltage end to be electrically connected to the first end of the first energy storage unit, enabling, by the first charging path control unit, the second end of the first energy storage unit to be electrically connected to the second end of the second energy storage unit and enabling, by the first voltage application control unit, the first end of the second energy storage unit to be electrically connected to the second voltage end so as to form the charging paths from the first input voltage end to the first energy storage unit and the second energy storage unit, and enabling, by the first output control unit, the second end of the second energy storage unit to be electrically disconnected from the voltage output end. The first output step includes: at the first output stage, enabling, by the first input control unit, the first input voltage end to be electrically disconnected from the first end of the first energy storage unit, enabling, by the first charging path control unit, the second end of the first energy storage unit to be electrically disconnected from the second end of the second energy storage unit, and enabling, by the first voltage application control unit, the first end of the second energy storage unit to be electrically disconnected from the second voltage end; enabling, by the first input control unit, the first input voltage end to be electrically connected to the first end of the first energy storage unit, enabling, by the first charging path control unit, the second end of the first energy storage unit to be electrically connected to the first end of the second energy storage unit, enabling, by the first voltage application control unit, the first end of the second energy storage unit to be electrically connected to the second voltage end, and enabling, by the first output control unit, the second end of the second energy storage unit to be electrically connected to the voltage output end, so as to form the charging paths from the first input voltage end to the first energy storage unit and the second energy storage unit, and apply a voltage to the voltage output end.

To be specific, in the first step-up mode, the second charging step includes: at the second charging stage, enabling, by the second input control unit, the second input voltage end to be electrically connected to the second end of the fourth energy storage unit, enabling, by the second charging path control unit, the second end of the third energy storage unit to be electrically connected to the first end of the fourth energy storage unit and enabling, by the second voltage application control unit, the first end of the third energy storage unit to be electrically connected to the third voltage end, so as to form charging paths from the second input voltage end to the third energy storage unit and the fourth energy storage unit; and enabling, by the second output control unit, the second end of the fourth energy storage unit to be electrically disconnected from the voltage output end. The second output step includes: at the second output stage, enabling, by the second input control unit, the second input voltage end to be electrically disconnected from the second end of the fourth energy storage unit, enabling, by the second charging path control unit, the second end of the third energy storage unit to be electrically disconnected from the first end of the fourth energy storage unit, and enabling, by the second voltage application control unit, the first end of the third energy storage unit to be electrically disconnected from the third voltage end; enabling, by the second input control unit, the first end of the third energy storage unit to be electrically connected to the second input voltage end, enabling, by the second charging path control unit, the second end of the third energy storage unit to be electrically connected to the second end of the fourth energy storage unit, and enabling, by the second input control unit, the second input voltage end to be electrically connected to the first end of the fourth energy storage unit, so as to form charging paths from the second input voltage end to the third energy storage unit and the fourth energy storage unit; and enabling, by the second output control unit, the second end of the fourth energy storage unit to be electrically connected to the voltage output end.

To be specific, in the second step-up mode, the second charging step includes: at the second charging stage, enabling, by the second input control unit, the second input voltage end to be electrically connected to the second end of the fourth energy storage unit, and enabling, by the second voltage application control unit, the first end of the fourth energy storage unit to be electrically connected to the fourth voltage end, so as to form the charging path from the second input voltage end to the fourth energy storage unit; enabling, by the second input control unit, the second input voltage end to be electrically connected to the second end of the third energy storage unit, and enabling, by the second voltage application control unit, the first end of the third energy storage unit to be electrically connected to the third voltage end, so as to form the charging path from the second input voltage end to the third energy storage unit; and enabling, by the second output control unit, the second end of the fourth energy storage unit to be electrically disconnected from the voltage output end. The second output step includes: at the second output stage, enabling, by the second input control unit, the second input voltage end to be electrically disconnected from the second end of the fourth energy storage unit, and enabling, by the second voltage application control unit, the first end of the fourth energy storage unit to be electrically disconnected from the fourth voltage end; enabling, by the second input control unit, the second input voltage end to be electrically disconnected from the second end of the third energy storage unit, and enabling, by the second voltage application control unit, the first end of the third energy storage unit to be electrically disconnected from the third voltage end; enabling, by the second input control unit, the second input voltage end to be electrically connected to the first end of the fourth energy storage unit, enabling, by the second input control unit, the second input voltage end to be electrically connected to the first end of the third energy storage unit, and enabling, by the second charging path control unit, the second end of the third energy storage unit to be electrically connected to the second end of the fourth energy storage unit, so as to form the charging paths from the second input voltage end to the third energy storage unit and the fourth energy storage unit; and enabling, by the second output control unit, the second end of the fourth energy storage unit to be electrically connected to the voltage output end.

To be specific, in the third step-up mode, the second charging step includes: within the first charging time period of the second charging stage, enabling, by the second input control unit, the second input voltage end to be electrically connected to the second end of the third energy storage unit and enabling, by the second voltage application control unit, the first end of the third energy storage unit to be electrically connected to the third voltage end so as to form the charging path from the second input voltage end to the third energy storage unit, and enabling, by the second output control unit, the second end of the fourth energy storage unit to be electrically disconnected from the voltage output end; and within the second charging time period of the second charging stage, enabling, by the second input control unit, the second input voltage end to be electrically disconnected from the second end of the third energy storage unit, enabling, by the second voltage application control unit, the first end of the third energy storage unit to be electrically disconnected from the third voltage end, enabling, by the second input control unit, the second input voltage end to be electrically connected to the first end of the third energy storage unit, enabling, by the second charging path control unit, the second end of the third energy storage unit to be electrically connected to the second end of the fourth energy storage unit and enabling, by the second voltage application control unit, the first end of the fourth energy storage unit to be electrically connected to the fourth voltage end so as to form the charging paths from the second input voltage end to the third energy storage unit and the fourth energy storage unit, and enabling, by the second output control unit, the second end of the fourth energy storage unit to be electrically disconnected from the voltage output end. The second output step includes: at the second output stage, enabling, by the second input control unit, the second input voltage end to be electrically disconnected from the first end of the third energy storage unit, enabling, by the second charging path control unit, the second end of the third energy storage unit to be electrically disconnected from the second end of the fourth energy storage unit, and enabling, by the second voltage application control unit, the first end of the fourth energy storage unit to be electrically disconnected from the second voltage end; and enabling, by the second input control unit, the second input voltage end to be electrically connected to the first end of the fourth energy storage unit, and enabling, by the first output control unit, the second end of the fourth energy storage unit to be electrically connected to the voltage output end, so as to form the charging path from the second input voltage end to the fourth energy storage unit, and apply a voltage to the voltage output end.

To be specific, in the fourth step-up mode, the second charging step includes: within the first charging time period of the second charging stage, enabling, by the second input control unit, the second input voltage end to be electrically connected to the second end of the third energy storage unit and enabling, by the second voltage application control unit, the first end of the third energy storage unit to be electrically connected to the third voltage end so as to form the charging path from the second input voltage end to the third energy storage unit, and enabling, by the second output control unit, the second end of the fourth energy storage unit to be electrically disconnected from the voltage output end; and within the second charging time period of the second charging stage, enabling, by the second input control unit, the second input voltage end to be electrically disconnected from the second end of the third energy storage unit, enabling, by the second voltage application control unit, the first end of the third energy storage unit to be electrically disconnected from the third voltage end, enabling, by the second input control unit, the second input voltage end to be electrically connected to the first end of the third energy storage unit, enabling, by the second charging path control unit, the second end of the third energy storage unit to be electrically connected to the second end of the fourth energy storage unit and enabling, by the second voltage application control unit, the first end of the fourth energy storage unit to be electrically connected to the fourth voltage end so as to form the charging paths from the second input voltage end to the third energy storage unit and the fourth energy storage unit, and enabling, by the second output control unit, the second end of the fourth energy storage unit to be electrically disconnected from the voltage output end. The second output step includes: at the second output stage, enabling, by the second input control unit, the second input voltage end to be electrically disconnected from the first end of the third energy storage unit, enabling, by the second charging path control unit, the second end of the third energy storage unit to be electrically disconnected from the second end of the fourth energy storage unit, and enabling, by the second voltage application control unit, the first end of the fourth energy storage unit to be electrically disconnected from the fourth voltage end; and enabling, by the second input control unit, the second input voltage end to be electrically connected to the first end of the third energy storage unit, enabling, by the second charging path control unit, the second end of the third energy storage unit to be electrically connected to the first end of the fourth energy storage unit, enabling, by the second voltage application control unit, the first end of the fourth energy storage unit to be electrically connected to the fourth voltage end, and enabling, by the second output control unit, the second end of the fourth energy storage unit to be electrically connected to the voltage output end, so as to form the charging paths from the second input voltage end to the third energy storage unit and the fourth energy storage unit, and apply a voltage to the voltage output end.

The present disclosure further provides in some embodiments a display device including the above-mentioned charge pump. The display device may be any product or member having a display function, e.g., mobile phone, flat-panel computer, television, display, laptop computer, digital photo frame or navigator.

The functional members described in the specification may be referred to as modules or units, so as to emphasize the independence of the implementation in a more particular manner.

In the embodiments of the present disclosure, each of the modules or units may be implemented by software, so as to be executed by various processors. For example, an identified, executable code module or unit may include one or more physical or logical blocks including computer instructions, and for example, the module or unit may be constructed as an object, a process or a function. Even so, the executable codes of the identified modules or units are unnecessary to be physically located together, but may include different instructions stored at different locations. When these instructions are logically combined together, they may form the modules or units and achieve the prescribed purposes of the modules or units.

Actually, the executable code module or unit may be a single instruction or a plurality of instructions, and may even be distributed at different code segments, in different programs, or across a plurality of memory devices. Also, operational data may be identified in the modules or units, implemented in any appropriate form, and organized in any data structure of an appropriate type. The operational data may be collected as a single data set, or distributed at different locations (including different memory devices), and may be at least partially present in a system or network merely as an electronic signal.

Alternatively, each of the modules or units may be implemented as a corresponding hardware circuitry or circuit. The hardware circuitry or circuit may include a very-large-scale integration (VLSI) circuit, a gate array, a semiconductor such as a logic chip and a transistor in the related art, or other discrete components. The module or unit may further be implemented by a programmable hardware device, such as a field-programmable gate array, a programmable array logic device and a programmable logic device.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A charge pump, comprising a voltage output end and a first step-up circuitry, wherein
   the first step-up circuitry comprises a first energy storage circuit, a second energy storage circuit, a first input control circuit, a first voltage application control circuit, a first output control circuit and a first charging path control circuit;
   the first input control circuit is configured to enable a first input voltage end to be electrically connected to, or electrically disconnected from, a first end of the first energy storage circuit, enable the first input voltage end to be electrically connected to, or electrically disconnected from, a second end of the first energy storage circuit, enable the first input voltage end to be electrically connected to, or electrically disconnected from, a first end of the second energy storage circuit, and enable the first input voltage end to be electrically connected to, or electrically disconnected from, a second end of the second energy storage circuit;
   the first voltage application control circuit is configured to enable the first end of the first energy storage circuit to be electrically connected to, or electrically disconnected from, a first voltage end, and enable the first end of the second energy storage circuit to be electrically connected to, or electrically disconnected from, a second voltage end;
   the first charging path control circuit is configured to enable the second end of the first energy storage circuit to be electrically connected to, or electrically disconnected from, the first end of the second energy storage circuit, and enable the second end of the first energy storage circuit to be electrically connected to, or electrically disconnected from, the second end of the second energy storage circuit; and
   the first output control circuit is configured to enable the second end of the second energy storage circuit to be electrically connected to, or electrically disconnected from, the voltage output end,
   wherein the charge pump further comprises a second step-up circuitry, wherein
   the second step-up circuitry comprises a third energy storage circuit, a fourth energy storage circuit, a second input control circuit, a second voltage application control circuit, a second output control circuit and a second charging path control circuit;
   the second input control circuit is configured to enable a second input voltage end to be electrically connected to, or electrically disconnected from, a first end of the third energy storage circuit, enable the second input voltage end to be electrically connected to, or electrically disconnected from, a second end of the third energy storage circuit, enable the second input voltage end to be electrically connected to, or electrically disconnected from, a first end of the fourth energy storage circuit, and enable the second input voltage end to be electrically connected to, or electrically disconnected from, a second end of the fourth energy storage circuit;
   the second voltage application control circuit is configured to enable the first end of the third energy storage circuit to be electrically connected to, or electrically disconnected from, a third voltage end, and enable the first end of the fourth energy storage circuit to be electrically connected to, or electrically disconnected from, a fourth voltage end;
   the second charging path control circuit is configured to enable the second end of the third energy storage circuit to be electrically connected to, or electrically disconnected from, the first end of the fourth energy storage circuit, and enable the second end of the third energy storage circuit to be electrically connected to, or electrically disconnected from, the second end of the fourth energy storage circuit; and
   the second output control circuit is configured to enable the second end of the fourth energy storage circuit to be electrically connected to, or electrically disconnected from, the voltage output end,
   wherein the first energy storage circuit comprises a first storage capacitor, a negative plate of the first storage capacitor is the first end of the first energy storage circuit, and a positive plate of the first storage capacitor is the second end of the first energy storage circuit;
   the second energy storage circuit comprises a second storage capacitor, a negative plate of the second storage capacitor is the first end of the second energy storage circuit, and a positive plate of the second storage capacitor is the second end of the second energy storage circuit; and
   the first input control circuit comprises:
      a first input control transistor, wherein a first electrode of the first input control transistor is electrically connected to the first input voltage end, and a second electrode of the first input control transistor is electrically connected to the positive plate of the second storage capacitor;
a second input control transistor, wherein a first electrode of the second input control transistor is electrically connected to the first input voltage end, and a second electrode of the second input control transistor is electrically connected to the negative plate of the first storage capacitor;
a third input control transistor, wherein a first electrode of the third input control transistor is electrically connected to the first input voltage end, and a second electrode of the third input control transistor is electrically connected to the positive plate of the first storage capacitor;
a fourth input control transistor, wherein a first electrode of the fourth input control transistor is electrically connected to the first input voltage end, and a second electrode of the fourth input control transistor is electrically connected to the negative plate of the second storage capacitor; and
a first input control sub-circuit, wherein the first input control sub-circuit is electrically connected to a gate electrode of the first input control transistor, a gate electrode of the second input control transistor, a gate electrode of the third input control transistor and a gate electrode of the fourth input control transistor, and the first input control sub-circuit is configured to turn on or turn off the first input control transistor, turn on or turn off the second input control transistor, turn on or turn off the third input control transistor, and turn on or turn off the fourth input control transistor.

2. The charge pump according to claim 1, further comprising:
an input voltage control circuitry configured to apply respective input voltages to the first input voltage end and the second input voltage end alternately.

3. The charge pump according to claim 1, wherein
the first voltage application control circuit comprises:
a first voltage application control transistor, wherein a first electrode of the first voltage application control transistor is electrically connected to the negative plate of the first storage capacitor, and a second electrode of the first voltage application control transistor is electrically connected to the first voltage end;
a second voltage application control transistor, wherein a first electrode of the second voltage application control transistor is electrically connected to the negative plate of the second storage capacitor, and a second electrode of the second voltage application control transistor is electrically connected to the second voltage end; and
a first voltage application control sub-circuit, wherein the first voltage application control sub-circuit is electrically connected to a gate electrode of the first voltage application control transistor and a gate electrode of the second voltage application control transistor, and the first voltage application control sub-circuit is configured to turn on or turn off the first voltage application control transistor and turn on or turn off the second voltage application control transistor,
the first charging path control circuit comprises:
a first charging path control transistor, wherein a first electrode of the first charging path control transistor is electrically connected to the positive plate of the first storage capacitor, and a second electrode of the first charging path control transistor is electrically connected to the positive plate of the second storage capacitor;
a second charging path control transistor, wherein a first electrode of the second charging path control transistor is electrically connected to the positive plate of the first storage capacitor, and a second electrode of the second charging path control transistor is electrically connected to the negative plate of the second storage capacitor; and
a first charging path control sub-circuit, wherein the first charging path control sub-circuit is electrically connected to a gate electrode of the first charging path control transistor and a gate electrode of the second charging path control transistor, and the first charging path control sub-circuit is configured to turn on or turn off the first charging path control transistor and turn on or turn off the second charging path control transistor, and
the first output control circuit comprises:
a first output control transistor, wherein a first electrode of the first output control transistor is electrically connected to the positive plate of the second storage capacitor, and a second electrode of the first output control transistor is electrically connected to the voltage output end; and
a first output control sub-circuit electrically connected to a gate electrode of the first output control transistor and configured to turn on or turn off the first output control transistor.

4. A charge pump, comprising a voltage output end and a first step-up circuitry, wherein
the first step-up circuitry comprises a first energy storage circuit, a second energy storage circuit, a first input control circuit, a first voltage application control circuit, a first output control circuit and a first charging path control circuit;
the first input control circuit is configured to enable a first input voltage end to be electrically connected to, or electrically disconnected from, a first end of the first energy storage circuit, enable the first input voltage end to be electrically connected to, or electrically disconnected from, a second end of the first energy storage circuit, enable the first input voltage end to be electrically connected to, or electrically disconnected from, a first end of the second energy storage circuit, and enable the first input voltage end to be electrically connected to, or electrically disconnected from, a second end of the second energy storage circuit;
the first voltage application control circuit is configured to enable the first end of the first energy storage circuit to be electrically connected to, or electrically disconnected from, a first voltage end, and enable the first end of the second energy storage circuit to be electrically connected to, or electrically disconnected from, a second voltage end;
the first charging path control circuit is configured to enable the second end of the first energy storage circuit to be electrically connected to, or electrically disconnected from, the first end of the second energy storage circuit, and enable the second end of the first energy storage circuit to be electrically connected to, or electrically disconnected from, the second end of the second energy storage circuit; and the first output control circuit is configured to enable the second end of the second energy storage circuit to be electrically connected to, or electrically disconnected from, the voltage output end, wherein the charge pump further comprises a second step-up circuitry, wherein the second step-up circuitry comprises a third energy storage circuit, a fourth energy storage circuit, a second input control circuit, a second voltage application control circuit, a second output control circuit and a second charging path control circuit;

the second input control circuit is configured to enable a second input voltage end to be electrically connected to, or electrically disconnected from, a first end of the third energy storage circuit, enable the second input voltage end to be electrically connected to, or electrically disconnected from, a second end of the third energy storage circuit, enable the second input voltage end to be electrically connected to, or electrically disconnected from, a first end of the fourth energy storage circuit, and enable the second input voltage end to be electrically connected to, or electrically disconnected from, a second end of the fourth energy storage circuit;

the second voltage application control circuit is configured to enable the first end of the third energy storage circuit to be electrically connected to, or electrically disconnected from, a third voltage end, and enable the first end of the fourth energy storage circuit to be electrically connected to, or electrically disconnected from, a fourth voltage end;

the second charging path control circuit is configured to enable the second end of the third energy storage circuit to be electrically connected to, or electrically disconnected from, the first end of the fourth energy storage circuit, and enable the second end of the third energy storage circuit to be electrically connected to, or electrically disconnected from, the second end of the fourth energy storage circuit; and the second output control circuit is configured to enable the second end of the fourth energy storage circuit to be electrically connected to, or electrically disconnected from, the voltage output end, wherein the third energy storage circuit comprises a third storage capacitor, a negative plate of the third storage capacitor is the first end of the third energy storage circuit and a positive plate of the third storage capacitor is the second end of the third energy storage circuit, the fourth energy storage circuit comprises a fourth storage capacitor, a negative plate of the fourth storage capacitor is the first end of the fourth energy storage circuit, and a positive plate of the fourth storage capacitor is the second end of the fourth energy storage circuit, and the second input control circuit comprises:
　a fifth input control transistor, wherein a first electrode of the fifth input control transistor is electrically connected to the second input voltage end, and a second electrode of the fifth input control transistor is electrically connected to the positive plate of the fourth storage capacitor;
　a sixth input control transistor, wherein a first electrode of the sixth input control transistor is electrically connected to the second input voltage end, and a second electrode of the sixth input control transistor is electrically connected to the negative plate of the third storage capacitor;
　a seventh input control transistor, wherein a first electrode of the seventh input control transistor is electrically connected to the second input voltage end, and a second electrode of the seventh input control transistor is electrically connected to the positive plate of the third storage capacitor;
　an eighth input control transistor, wherein a first electrode of the eighth input control transistor is electrically connected to the second input voltage end, and a second electrode of the eighth input control transistor is electrically connected to the negative plate of the fourth storage capacitor; and
　a second input control sub-circuit, wherein the second input control sub-circuit is electrically connected to a gate electrode of the fifth input control transistor, a gate electrode of the sixth input control transistor, a gate electrode of the seventh input control transistor, and a gate electrode of the eighth input control transistor, and the second input control sub-circuit is configured to turn on or turn off the fifth input control transistor, turn on or turn off the sixth input control transistor, turn on or turn off the seventh input control transistor, and turn on or turn off the eighth input control transistor.

5. The charge pump according to claim 4, wherein
the second voltage application control circuit comprises:
　a third voltage application control transistor, wherein a first electrode of the third voltage application control transistor is electrically connected to the negative plate of the third storage capacitor, and a second electrode of the third voltage application control transistor is electrically connected to the third voltage end;
　a fourth voltage application control transistor, wherein a first electrode of the fourth voltage application control transistor is electrically connected to the negative plate of the fourth storage capacitor, and a second electrode of the fourth voltage application control transistor is electrically connected to the fourth voltage end; and
　a second voltage application control sub-circuit, wherein the second voltage application control sub-circuit is electrically connected to a gate electrode of the third voltage application control transistor and a gate electrode of the fourth voltage application control transistor, and the second voltage application control sub-circuit is configured to turn on or turn off the third voltage application control transistor, and turn on or turn off the fourth voltage application control transistor, the second charging path control circuit comprises:
　a third charging path control transistor, wherein a first electrode of the third charging path control transistor is electrically connected to the positive plate of the third storage capacitor, and a second electrode of the third charging path control transistor is electrically connected to the positive plate of the fourth storage capacitor;
　a fourth charging path control transistor, wherein a first electrode of the fourth charging path control transistor is electrically connected to the positive plate of the third storage capacitor, and a second electrode of the fourth charging path control transistor is electrically connected to the negative plate of the fourth storage capacitor; and a second charging path control sub-circuit, wherein the second charging path control sub-circuit is electrically connected to a gate electrode of the third charging path control transistor and a gate electrode of the fourth charging path control transistor, and the second charging path control sub-circuit is configured to turn on or turn off the third charging path control transistor, and turn on or turn off the fourth charging path control transistor, and the second output control circuit comprises:

a second output control transistor, wherein a first electrode of the second output control transistor is electrically connected to the positive plate of the fourth storage capacitor, and a second electrode of the second output control transistor is electrically connected to the voltage output end; and a second output control sub-circuit electrically connected to a gate electrode of the second output control transistor, and configured to turn on or turn off the second output control transistor.

6. A charge pump, comprising a voltage output end and a first step-up circuitry, wherein the first step-up circuitry comprises a first energy storage circuit, a second energy storage circuit, a first input control circuit, a first voltage application control circuit, a first output control circuit and a first charging path control circuit;

the first input control circuit is configured to enable a first input voltage end to be electrically connected to, or electrically disconnected from, a first end of the first energy storage circuit, enable the first input voltage end to be electrically connected to, or electrically disconnected from, a second end of the first energy storage circuit, enable the first input voltage end to be electrically connected to, or electrically disconnected from, a first end of the second energy storage circuit, and enable the first input voltage end to be electrically connected to, or electrically disconnected from, a second end of the second energy storage circuit;

the first voltage application control circuit is configured to enable the first end of the first energy storage circuit to be electrically connected to, or electrically disconnected from, a first voltage end, and enable the first end of the second energy storage circuit to be electrically connected to, or electrically disconnected from, a second voltage end;

the first charging path control circuit is configured to enable the second end of the first energy storage circuit to be electrically connected to, or electrically disconnected from, the first end of the second energy storage circuit, and enable the second end of the first energy storage circuit to be electrically connected to, or electrically disconnected from, the second end of the second energy storage circuit; and the first output control circuit is configured to enable the second end of the second energy storage circuit to be electrically connected to, or electrically disconnected from, the voltage output end, wherein the charge pump further comprises a second step-up circuitry, wherein the second step-up circuitry comprises a third energy storage circuit, a fourth energy storage circuit, a second input control circuit, a second voltage application control circuit, a second output control circuit and a second charging path control circuit;

the second input control circuit is configured to enable a second input voltage end to be electrically connected to, or electrically disconnected from, a first end of the third energy storage circuit, enable the second input voltage end to be electrically connected to, or electrically disconnected from, a second end of the third energy storage circuit, enable the second input voltage end to be electrically connected to, or electrically disconnected from, a first end of the fourth energy storage circuit, and enable the second input voltage end to be electrically connected to, or electrically disconnected from, a second end of the fourth energy storage circuit;

the second voltage application control circuit is configured to enable the first end of the third energy storage circuit to be electrically connected to, or electrically disconnected from, a third voltage end, and enable the first end of the fourth energy storage circuit to be electrically connected to, or electrically disconnected from, a fourth voltage end;

the second charging path control circuit is configured to enable the second end of the third energy storage circuit to be electrically connected to, or electrically disconnected from, the first end of the fourth energy storage circuit, and enable the second end of the third energy storage circuit to be electrically connected to, or electrically disconnected from, the second end of the fourth energy storage circuit; and the second output control circuit is configured to enable the second end of the fourth energy storage circuit to be electrically connected to, or electrically disconnected from, the voltage output end, wherein the charge pump further comprises:

an output capacitor, a positive plate of the output capacitor is electrically connected to the voltage output end, and a negative plate of the output capacitor is electrically connected to a fifth voltage end; and a switch control circuit electrically connected to the first end of the second energy storage circuit and the second end of the fourth energy storage circuit, and configured to enable the first end of the second energy storage circuit to be electrically connected to, or electrically disconnected from, the second end of the fourth energy storage circuit.

7. A voltage control method for the charge pump according to claim 1, comprising, within a first voltage control time period:

a first charging step of, at a first charging stage, controlling, by at least one of the first input control circuit, the first voltage application control circuit, and the first charging path control circuit, a charging path from the first input voltage end to the first energy storage circuit, controlling, by at least one of the first input control circuit, the first voltage application control circuit, and the first charging path control circuit, a charging path from the first input voltage end to the second energy storage circuit, and enabling, by the first output control circuit, the second end of the second energy storage circuit to be electrically disconnected from the voltage output end; and a first output step of, at a first output stage, enabling, by the first output control circuit, the second end of the second energy storage circuit to be electrically connected to the voltage output end, and controlling, by at least one of the first input control circuit, the first voltage application control circuit and the first charging path control circuit, charging paths from the first input voltage end to the first energy storage circuit and the second energy storage circuit, or a charging path from the first input voltage end to the second energy storage circuit, wherein the charge pump further comprises a second step-up circuitry, the second step-up circuitry comprises a third energy storage circuit, a fourth energy storage circuit, a second input control circuit, a second voltage application control circuit, a second output control circuit and a second charging path control circuit, and each step-up period comprises first voltage control time periods and second voltage control time periods arranged alternately, wherein within each second voltage control time period, the voltage control method further comprises:

a second charging step of, at a second charging stage, controlling, by at least one of the second input control circuit, the second voltage application control circuit and the second charging path control circuit, a charging path from a second input voltage end to the third energy storage circuit, controlling, by at least one of the second input control circuit, the second voltage application control circuit and the second charging path control circuit, a charging path from the second input voltage end to the fourth energy storage circuit, and enabling, by the second output control circuit, a second end of the fourth energy storage circuit to be electrically disconnected from the voltage output end; and a second output step of, at a second output stage, enabling, by the second output control circuit, the second end of the fourth energy storage circuit to be electrically connected to the voltage output end, and controlling, by at least one of the second input control circuit, the second voltage application control circuit and the second charging path control circuit, charging paths from the second input voltage end to the third energy storage circuit and the fourth energy storage circuit, or a charging path from the second input voltage end to the fourth energy storage circuit, wherein the charge pump further comprises an input voltage control circuit, and the voltage control method further comprises:

within each first voltage control time period, applying, by the input voltage control circuit, a first input voltage to the first input voltage end, and enabling, by the second output control circuit, the second end of the fourth energy storage circuit to be electrically disconnected from the voltage output end; and within each second voltage control time period, applying, by the input voltage control circuit, a second input voltage to the second input voltage end, and enabling, by the first output control circuit, the second end of the second energy storage circuit to be electrically disconnected from the voltage output end.

8. The voltage control method according to claim 7, wherein in a first step-up mode, the first charging step comprises:

at the first charging stage, enabling, by the first input control circuit, the first input voltage end to be electrically connected to the second end of the second energy storage circuit; enabling, by the first charging path control circuit, the second end of the first energy storage circuit to be electrically connected to the first end of the second energy storage circuit; enabling, by the first voltage application control circuit, the first end of the first energy storage circuit to be electrically connected to a first voltage end, to form the charging paths from the first input voltage end to the first energy storage circuit and the second energy storage circuit; and enabling, by the first output control circuit, the second end of the second energy storage circuit to be electrically disconnected from the voltage output end, and the first output step comprises:

at the first output stage, enabling, by the first input control circuit, the first input voltage end to be electrically disconnected from the second end of the second energy storage circuit; enabling, by the first charging path control circuit, the second end of the first energy storage circuit to be electrically disconnected from the first end of the second energy storage circuit; enabling, by the first voltage application control circuit, the first end of the first energy storage circuit to be electrically disconnected from the first voltage end; enabling, by the first input control circuit, the first end of the first energy storage circuit to be electrically connected to the first input voltage end; enabling, by the first charging path control circuit, the second end of the first energy storage circuit to be electrically connected to the second end of the second energy storage circuit; enabling, by the first input control circuit, the first input voltage end to be electrically connected to the first end of the second energy storage circuit, to form the charging paths from the first input voltage end to the first energy storage circuit and the second energy storage circuit; and enabling, by the first output control circuit, the second end of the second energy storage circuit to be electrically connected to the voltage output end.

9. The voltage control method according to claim 7, wherein in a second step up mode, the first charging step comprises:

at the first charging stage, enabling, by the first input control circuit, the first input voltage end to be electrically connected to the second end of the second energy storage circuit, and enabling, by the first voltage application control circuit, the first end of the second energy storage circuit to be electrically connected to the second voltage end, to form the charging path from the first input voltage end to the second energy storage circuit; enabling, by the first input control circuit, the first input voltage end to be electrically connected to the second end of the first energy storage circuit, and enabling, by the first voltage application control circuit, the first end of the first energy storage circuit to be electrically connected to the first voltage end, to form the charging path from the first input voltage end to the first energy storage circuit; and enabling, by the first output control circuit, the second end of the second energy storage circuit to be electrically disconnected from the voltage output end, and the first output step comprises:

at the first output stage, enabling, by the first input control circuit, the first input voltage end to be electrically disconnected from the second end of the second energy storage circuit, and enabling, by the first voltage application control circuit, the first end of the second energy storage circuit to be electrically disconnected from the second voltage end; enabling, by the first input control circuit, the first input voltage end to be electrically disconnected from the second end of the first energy storage circuit, and enabling, by the first voltage application control circuit, the first end of the first energy storage circuit to be electrically disconnected from the first voltage end; enabling, by the first input control circuit, the first input voltage end to be electrically connected to the first end of the second energy storage circuit, enabling, by the first input control circuit, the first input voltage end to be electrically connected to the first end of the first energy storage circuit, and enabling, by the first charging path control circuit, the second end of the first energy storage circuit to be electrically connected to the second end of the second energy storage circuit, to form the charging paths from the first input voltage end to the first energy storage circuit and the second energy storage circuit; and enabling, by the first output control circuit, the second end of the second energy storage circuit to be electrically connected to the voltage output end.

10. The voltage control method according to claim 7, wherein in a third step-up mode, the first charging step comprises:

within a first charging time period of the first charging stage, enabling, by the first input control circuit, the first input voltage end to be electrically connected to the second end of the first energy storage circuit, enabling, by the first voltage application control circuit, the first end of the first energy storage circuit to be electrically connected to the first voltage end, to form the charging path from the first input voltage end to the first energy storage circuit, and enabling, by the first output control circuit, the second end of the second energy storage circuit to be electrically disconnected from the voltage output end; and within a second charging time period of the first charging stage, enabling, by the first input control circuit, the first input voltage end to be electrically disconnected from the second end of the first energy storage circuit, enabling, by the first voltage application control circuit, the first end of the first energy storage circuit to be electrically disconnected from the first voltage end, enabling, by the first input control circuit, the first input voltage end to be electrically connected to the first end of the first energy storage circuit, enabling, by the first charging path control circuit, the second end of the first energy storage circuit to be electrically connected to the second end of the second energy storage circuit, enabling, by the first voltage application control circuit, the first end of the second energy storage circuit to be electrically connected to the second voltage end, to form the charging paths from the first input voltage end to the first energy storage circuit and the second energy storage circuit, and enabling, by the first output control circuit, the second end of the second energy storage circuit to be electrically disconnected from the voltage output end, and the first output step comprises:

at the first output stage, enabling, by the first input control circuit, the first input voltage end to be electrically disconnected from the first end of the first energy storage circuit, enabling, by the first charging path control circuit, the second end of the first energy storage circuit to be electrically disconnected from the second end of the second energy storage circuit, and enabling, by the first voltage application control circuit, the first end of the second energy storage circuit to be electrically disconnected from the second voltage end; and enabling, by the first input control circuit, the first input voltage end to be electrically connected to the first end of the second energy storage circuit, and enabling, by the first output control circuit, the second end of the second energy storage circuit to be electrically connected to the voltage output end, to form the charging path from the first input voltage end to the second energy storage circuit, and apply a voltage to the voltage output end.

11. The voltage control method according to claim 7, wherein in a fourth step-up mode, the first charging step comprises:

within the first charging time period of the first charging stage, enabling, by the first input control circuit, the first input voltage end to be electrically connected to the second end of the first energy storage circuit, enabling, by the first voltage application control circuit, the first end of the first energy storage circuit to be electrically connected to the first voltage end, to form the charging path from the first input voltage end to the first energy storage circuit, and enabling, by the first output control circuit, the second end of the second energy storage circuit to be electrically disconnected from the voltage output end; and within the second charging time period of the first charging stage, enabling, by the first input control circuit, the first input voltage end to be electrically disconnected from the second end of the first energy storage circuit, enabling, by the first voltage application control circuit, the first end of the first energy storage circuit to be electrically disconnected from the first voltage end; enabling, by the first input control circuit, the first input voltage end to be electrically connected to the first end of the first energy storage circuit, enabling, by the first charging path control circuit, the second end of the first energy storage circuit to be electrically connected to the second end of the second energy storage circuit, enabling, by the first voltage application control circuit, the first end of the second energy storage circuit to be electrically connected to the second voltage end, to form the charging paths from the first input voltage end to the first energy storage circuit and the second energy storage circuit, and enabling, by the first output control circuit, the second end of the second energy storage circuit to be electrically disconnected from the voltage output end, and the first output step comprises:

at the first output stage, enabling, by the first input control circuit, the first input voltage end to be electrically disconnected from the first end of the first energy storage circuit, enabling, by the first charging path control circuit, the second end of the first energy storage circuit to be electrically disconnected from the second end of the second energy storage circuit, and enabling, by the first voltage application control circuit, the first end of the second energy storage circuit to be electrically disconnected from the second voltage end; and enabling, by the first input control circuit, the first input voltage end to be electrically connected to the first end of the first energy storage circuit, enabling, by the first charging path control circuit, the second end of the first energy storage circuit to be electrically connected to the first end of the second energy storage circuit, enabling, by the first voltage application control circuit, the first end of the second energy storage circuit to be electrically connected to the second voltage end, and enabling, by the first output control circuit, the second end of the second energy storage circuit to be electrically connected to the voltage output end, to form the charging paths from the first input voltage end to the first energy storage circuit and the second energy storage circuit, and apply a voltage to the voltage output end.

12. The voltage control method according to claim 7, wherein in the first step-up mode, the second charging step comprises:
at the second charging stage, enabling, by the second input control circuit, the second input voltage end to be electrically connected to the second end of the fourth energy storage circuit, enabling, by the second charging path control circuit, the second end of the third energy storage circuit to be electrically connected to the first end of the fourth energy storage circuit and enabling, by the second voltage application control circuit, the first end of the third energy storage circuit to be electrically connected to the third voltage end, to form charging paths from the second input voltage end to the third energy storage circuit and the fourth energy storage circuit; and enabling, by the second output control circuit, the second end of the fourth energy storage circuit to be electrically disconnected from the voltage output end, and the second output step comprises:
at the second output stage, enabling, by the second input control circuit, the second input voltage end to be electrically disconnected from the second end of the fourth energy storage circuit, enabling, by the second charging path control circuit, the second end of the third energy storage circuit to be electrically disconnected from the first end of the fourth energy storage circuit, and enabling, by the second voltage application control circuit, the first end of the third energy storage circuit to be electrically disconnected from the third voltage end; enabling, by the second input control circuit, the first end of the third energy storage circuit to be electrically connected to the second input voltage end, enabling, by the second charging path control circuit, the second end of the third energy storage circuit to be electrically connected to the second end of the fourth energy storage circuit, and enabling, by the second input control circuit, the second input voltage end to be electrically connected to the first end of the fourth energy storage circuit, to form charging paths from the second input voltage end to the third energy storage circuit and the fourth energy storage circuit; and enabling, by the second output control circuit, the second end of the fourth energy storage circuit to be electrically connected to the voltage output end.

13. The voltage control method according to claim 7, wherein in the second step-up mode, the second charging step comprises:
at the second charging stage, enabling, by the second input control circuit, the second input voltage end to be electrically connected to the second end of the fourth energy storage circuit, and enabling, by the second voltage application control circuit, the first end of the fourth energy storage circuit to be electrically connected to the fourth voltage end, to form the charging path from the second input voltage end to the fourth energy storage circuit; enabling, by the second input control circuit, the second input voltage end to be electrically connected to the second end of the third energy storage circuit, and enabling, by the second voltage application control circuit, the first end of the third energy storage circuit to be electrically connected to the third voltage end, to form the charging path from the second input voltage end to the third energy storage circuit; and enabling, by the second output control circuit, the second end of the fourth energy storage circuit to be electrically disconnected from the voltage output end, and the second output step comprises:
at the second output stage, enabling, by the second input control circuit, the second input voltage end to be electrically disconnected from the second end of the fourth energy storage circuit, and enabling, by the second voltage application control circuit, the first end of the fourth energy storage circuit to be electrically disconnected from the fourth voltage end; enabling, by the second input control circuit, the second input voltage end to be electrically disconnected from the second end of the third energy storage circuit, and enabling, by the second voltage application control circuit, the first end of the third energy storage circuit to be electrically disconnected from the third voltage end; enabling, by the second input control circuit, the second input voltage end to be electrically connected to the first end of the fourth energy storage circuit, enabling, by the second input control circuit, the second input voltage end to be electrically connected to the first end of the third energy storage circuit, and enabling, by the second charging path control circuit, the second end of the third energy storage circuit to be electrically connected to the second end of the fourth energy storage circuit, to form the charging paths from the second input voltage end to the third energy storage circuit and the fourth energy storage circuit; and enabling, by the second output control circuit, the second end of the fourth energy storage circuit to be electrically connected to the voltage output end.

14. The voltage control method according to claim 7, wherein in the third step-up mode, the second charging step comprises:
within the first charging time period of the second charging stage, enabling, by the second input control circuit, the second input voltage end to be electrically connected to the second end of the third energy storage circuit, and enabling, by the second voltage application control circuit, the first end of the third energy storage circuit to be electrically connected to the third voltage end, to form the charging path from the second input voltage end to the third energy storage circuit, and enabling, by the second output control circuit, the second end of the fourth energy storage circuit to be electrically disconnected from the voltage output end; and
within the second charging time period of the second charging stage, enabling, by the second input control circuit, the second input voltage end to be electrically disconnected from the second end of the third energy storage circuit, enabling, by the second voltage application control circuit, the first end of the third energy storage circuit to be electrically disconnected from the third voltage end, enabling, by the second input control circuit, the second input voltage end to be electrically connected to the first end of the third energy storage circuit, enabling, by the second charging path control circuit, the second end of the third energy storage circuit to be electrically connected to the second end of the fourth energy storage circuit, and enabling, by the second voltage application control circuit, the first end of the fourth energy storage circuit to be electrically connected to the fourth voltage end, to form the charging paths from the second input voltage end to the third energy storage circuit and the fourth energy storage circuit, and enabling, by the second output control circuit, the second end of the fourth energy storage circuit to be electrically disconnected from the voltage output end, and the second output step comprises:
at the second output stage, enabling, by the second input control circuit, the second input voltage end to be electrically disconnected from the first end of the third energy storage circuit, enabling, by the second charging path control circuit, the second end of the third energy storage circuit to be electrically disconnected from the second end of the fourth energy storage circuit, and enabling, by the second voltage application control circuit, the first end of the fourth energy storage circuit to be electrically disconnected from the second voltage end; and enabling, by the second input control circuit, the second input voltage end to be electrically connected to the first end of the fourth energy storage circuit, and enabling, by the first output control circuit, the second end of the fourth energy storage circuit to be electrically connected to the voltage output end, to form the charging path from the second input voltage end to the fourth energy storage circuit, and apply a voltage to the voltage output end.

15. The voltage control method according to claim 7, wherein in the fourth step-up mode,
the second charging step comprises:
within the first charging time period of the second charging stage, enabling, by the second input control circuit, the second input voltage end to be electrically connected to the second end of the third energy storage circuit, and enabling, by the second voltage application control circuit, the first end of the third energy storage circuit to be electrically connected to the third voltage end, to form the charging path from the second input voltage end to the third energy storage circuit, and enabling, by the second output control circuit, the second end of the fourth energy storage circuit to be electrically disconnected from the voltage output end; and within the second charging time period of the second charging stage, enabling, by the second input control circuit, the second input voltage end to be electrically disconnected from the second end of the third energy storage circuit, enabling, by the second voltage application control circuit, the first end of the third energy storage circuit to be electrically disconnected from the third voltage end, enabling, by the second input control circuit, the second input voltage end to be electrically connected to the first end of the third energy storage circuit, enabling, by the second charging path control circuit, the second end of the third energy storage circuit to be electrically connected to the second end of the fourth energy storage circuit, and enabling, by the second voltage application control circuit, the first end of the fourth energy storage circuit to be electrically connected to the fourth voltage end, to form the charging paths from the second input voltage end to the third energy storage circuit and the fourth energy storage circuit, and enabling, by the second output control circuit, the second end of the fourth energy storage circuit to be electrically disconnected from the voltage output end, and the second output step comprises:
at the second output stage, enabling, by the second input control circuit, the second input voltage end to be electrically disconnected from the first end of the third energy storage circuit, enabling, by the second charging path control circuit, the second end of the third energy storage circuit to be electrically disconnected from the second end of the fourth energy storage circuit, and enabling, by the second voltage application control circuit, the first end of the fourth energy storage circuit to be electrically disconnected from the fourth voltage end; and enabling, by the second input control circuit, the second input voltage end to be electrically connected to the first end of the third energy storage circuit, enabling, by the second charging path control circuit, the second end of the third energy storage circuit to be electrically connected to the first end of the fourth energy storage circuit, enabling, by the second voltage application control circuit, the first end of the fourth energy storage circuit to be electrically connected to the fourth voltage end, and enabling, by the second output control circuit, the second end of the fourth energy storage circuit to be electrically connected to the voltage output end, to form the charging paths from the second input voltage end to the third energy storage circuit and the fourth energy storage circuit, and apply a voltage to the voltage output end.

16. A display device, comprising the charge pump according to claim 1.

* * * * *